United States Patent
Bhattacharyya et al.

(10) Patent No.: US 12,309,388 B2
(45) Date of Patent: May 20, 2025

(54) METHODS AND SYSTEMS FOR QUALITY OF EXPERIENCE-CENTRIC ADAPTIVE BITRATE ENCODING FOR LIVE VIDEO STREAMING

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 122 days.

(21) Appl. No.: 18/482,587

(22) Filed: Oct. 6, 2023

(65) Prior Publication Data
US 2024/0179325 A1 May 30, 2024

(30) Foreign Application Priority Data
Nov. 14, 2022 (IN) .............................. 202221065218

(51) Int. Cl.
*H04N 19/154* (2014.01)
*H04N 7/01* (2006.01)
(Continued)

(52) U.S. Cl.
CPC ........... *H04N 19/154* (2014.11); *H04N 7/013* (2013.01); *H04N 19/176* (2014.11); *H04N 19/59* (2014.11); *H04N 21/2187* (2013.01)

(58) Field of Classification Search
CPC ................. H04L 65/80; H04N 19/172; H04N 21/23439; H04N 19/46; H04N 19/154;
(Continued)

(56) References Cited

U.S. PATENT DOCUMENTS 9,530,450 B2 12/2016 Laksono et al.
10,045,050 B2 8/2018 Vanam et al.
(Continued)

FOREIGN PATENT DOCUMENTS

JP 6145460 B2 1/2013

OTHER PUBLICATIONS

Pietro Lungaro et al., "Gaze-aware streaming solutions for the next generation of mobile VR experiences," IEEE Transactions on Visualization and Computer Graphics, Jan. 25, 2018, pp. 1535-1544, Volume-issue Nos. vol. 24, Issue: 4, Publisher: IEEE, https://www.researchgate.net/publication/322710229_Gaze-Aware_Streaming_Solutions_for_the_Next_Generation_of_Mobile_VR_Experiences.
(Continued)

*Primary Examiner* — Farhan Mahmud
(74) *Attorney, Agent, or Firm* — Finnegan, Henderson, Farabow, Garrett & Dunner, LLP

(57) ABSTRACT

The disclosure relates generally to methods and systems for quality of experience (QoE)-centric adaptive bitrate encoding for a live video stream. Conventional QoE aware Adaptive Bit Rate (ABR) scheme may not be suitable for live interactive streams especially in bandwidth limited practical situations and does not address the core issues inherent in present ABR schemes. The present models the adaptation as a context specific multi-model tuning mechanism and provides a dual adaptation control for spatial encoding of each frame. This involves defining a starting region of potential attention by the user based on a standard estimate of eye-foveation with respect to the field of view (FOV) and then adapting it through a foveal-breathing technique. Further, a median based sparsification of quantized DCT coefficient matrix for each minimum coded unit (MCU) of a frame is introduced to satisfy channel bit budget without compromising the quality of the foveal region.

20 Claims, 17 Drawing Sheets

(51) Int. Cl.
*H04N 19/176* (2014.01)
*H04N 19/59* (2014.01)
*H04N 21/2187* (2011.01)

(58) Field of Classification Search
CPC ............. H04N 19/176; H04N 21/2187; H04N 19/14; H04N 19/167; H04N 19/162; G06T 19/006; G06T 2207/10016; G06T 2207/30168; G06T 7/20; G06V 40/20
See application file for complete search history.

(56) References Cited

U.S. PATENT DOCUMENTS

| | | | | |
|---|---|---|---|---|
| 2020/0107003 | A1* | 4/2020 | Phillips | H04N 13/344 |
| 2022/0329886 | A1* | 10/2022 | Phillips | H04N 21/6587 |
| 2023/0164330 | A1* | 5/2023 | Smith | H04N 19/149 |
| | | | | 382/239 |

OTHER PUBLICATIONS

Zhengfang Duanmu et al., "A Knowledge-Driven Quality-of-Experience Model for Adaptive Streaming Videos," Nov. 18, 2019, arXiv, https://arxiv.org/abs/1911.07944.

* cited by examiner

Obtaining a predominant error rate from the feedback of the instantaneous video quality of the live video stream, to determine a change in the predominant error rate for each of the one or more successive video frames 702

Performing one of: (i) a foveal shrinking on each of the one or more successive video frames when the change in the predominant error rate is greater than or equal to a predominant error rate threshold, and (ii) a foveal expansion on the each of the one or more successive video frames when the change in the predominant error rate is less than to the predominant error rate threshold, to obtain the one or more encoded successive video frames of the live video stream 704

FIG. 7

Obtaining a current foveal radius percentage factor for each of the one or more successive video frames of the live video stream 704a1

Determining a successive foveal radius percentage factor for each of the one or more successive video frames, by dividing the corresponding current foveal radius percentage factor with a foveal shrinking factor, if the current foveal radius percentage factor is greater than a minimum foveal radius percentage factor threshold 704a2

Determining the foveal breathing parameter for each of the one or more successive video frames 704a3 obtaining the one or more encoded successive video frames of the live video stream, by shrinking each of the one or more successive video frames based on the corresponding foveal breathing parameter and using the corresponding successive foveal radius percentage factor 704a4

FIG. 7A

Obtaining a current foveal radius percentage factor for each of the one or more successive video frames of the live video stream 704b1

Determining a successive foveal radius percentage factor for each of the one or more successive video frames, by adding the corresponding current foveal radius percentage factor with a foveal expansion factor, if the current foveal radius percentage factor is less than to a maximum foveal radius percentage factor threshold 704b2

Determining the foveal breathing parameter for each of the one or more successive video frames 704b3

Obtaining the one or more encoded successive video frames of the live video stream, by expanding each of the one or more successive video frames based on the corresponding foveal breathing parameter and using the corresponding successive foveal radius percentage factor 704b4

FIG. 7B

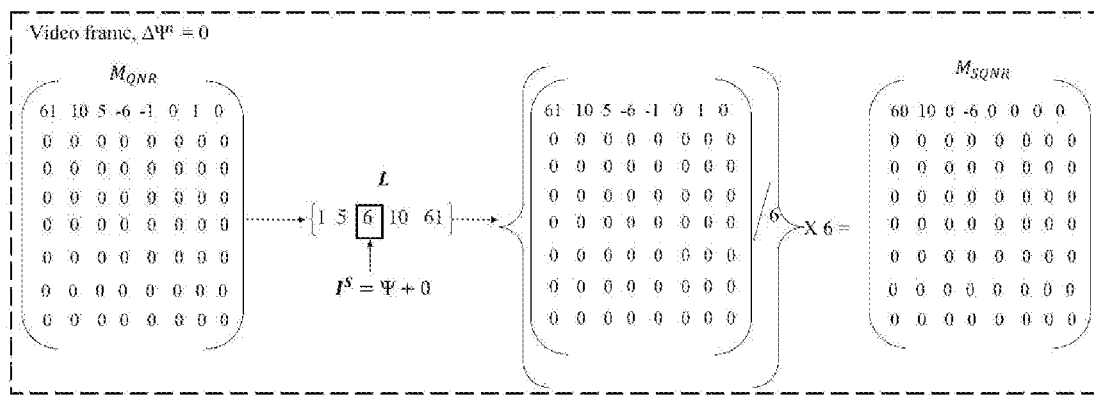

FIG. 8A

Determining a change in predominant error rate for each of the one or more successive video frames, wherein the predominant error rate is obtained from the feedback of the instantaneous video quality of the live video stream 1102

Obtaining an initial quantized matrix associated with a fundamental coding block for each of the one or more successive video frames of the live video stream 1104

Determining a scaling factor, based on (i) the change in predominant error rate for each of the one or more successive video frames using the corresponding initial quantized matrix, and (ii) a predominant error rate threshold, through a median position updation (MPU) algorithm 1106

Dividing and multiplying the initial quantized matrix with the scaling factor, to obtain a scaled quantized matrix associated with the fundamental coding block for each of the one or more successive video frames 1108

Determining the quality factor of the peripheral region associated with each of the one or more successive video frames, using the corresponding scaled quantized matrix 1110

Repeating the steps (a) through (e), based on the feedback of the instantaneous video quality of the live video stream and the quality factor of the peripheral region associated with each of the one or more successive video frames, to obtain the one or more encoded successive video frames of the live video stream 1112

FIG. 11

METHODS AND SYSTEMS FOR QUALITY OF EXPERIENCE-CENTRIC ADAPTIVE BITRATE ENCODING FOR LIVE VIDEO STREAMING

PRIORITY CLAIM

This U.S. patent application claims priority under 35 U.S.C. § 119 to: Indian Patent Application No. 202221065218, filed on Nov. 14, 2022. The entire contents of the aforementioned application are incorporated herein by reference.

TECHNICAL FIELD

The disclosure herein generally relates to the field of video streaming, and more specifically to methods and systems for quality of experience (QoE)-centric adaptive bitrate encoding for a live video stream.

BACKGROUND

Quality of experience (QoE) is an ultimate judgmental factor for the end-user of any video-streaming service. The Quality of experience (QoE) in turn also affects the perceived quality of service (QoS). In the tug-of-war between conflicting objectives of reliability and real-time delivery, the QoE suffers. Conventional adaptive bitrate schemes based on video delivery undermines QoE to satisfy a channel bitrate. Even conventional application layer forward error correction (AL-FEC) based techniques are also prone to poor real-time performance during lossy conditions due to slow reaction to channel impairment and are no longer used in UDP based transmission due to performance issue. Conventional QoS aware Adaptive Bit Rate (ABR) scheme that adaptively uses the encoding layers, may not be suitable for live interactive streams especially in bandwidth limited practical situations, and does not address the core issues inherent in present ABR schemes.

SUMMARY

Embodiments of the present disclosure present technological improvements as solutions to one or more of the above-mentioned technical problems recognized by the inventors in conventional systems.

In an aspect, a processor-implemented method for quality of experience (QoE)-centric adaptive bitrate encoding for a live video stream is provided. The method including the steps of: acquiring for a current video frame of the live video stream transmitted by a transmitter using an acquisition device, an area of a foveal region and an area of a peripheral region, using a foveal radius of the corresponding current video frame of the live video stream; initializing for each of one or more successive video frames of the live video stream, a quality of the foveal region, a quality of the peripheral region, a foveal breathing parameter, and a maximum desired frame rate; encoding spatially at the transmitter, each of the one or more successive video frames of the live video stream, based on the quality of the foveal region, the quality of the peripheral region, the foveal breathing parameter, and the maximum desired frame rate; receiving at the transmitter, an instantaneous feedback of a video quality, based on the one or more successive video frames of the live video stream, from a receiver, on a periodic timer expiry; selecting, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter; adaptively switching, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase; packetizing, the one or more encoded successive video frames of the live video stream, into one or more packets, using a packetization technique; transmitting, the one or more packets, to the receiver, through an adaptive real-time streaming technique; receiving, the one or more packets, at the receiver; reconstructing, the one or more frames from the one or more packets, depending on the encoding scheme employed at the transmitter; reducing, the maximum desired frame rate, if an actual bandwidth of the network is not satisfied for transmitting the one or more encoded successive video frames of the live video stream to the receiver; further encoding, the one or more encoded successive video frames of the live video stream, at the reduced maximum desired frame rate, for transmission; adaptively managing, via the one or more hardware processors, the quality of the foveal region to satisfy an actual bitrate supported by the network; increasing, the maximum desired frame rate, if the current bandwidth of the network required for transmitting the one or more encoded successive video frames of the live video stream, is less than the actual bandwidth of the network, at the current frame rate; further encoding, the one or more encoded successive video frames of the live video stream, at the increased maximum desired frame rate, for transmission; and adaptively managing, the quality of the foveal region to satisfy the actual bitrate supported by the network.

In another aspect, a system for quality of experience (QoE)-centric adaptive bitrate encoding for streaming of a live video stream is provided. The system includes: a memory storing instructions; one or more Input/Output (I/O) interfaces; and one or more hardware processors coupled to the memory via the one or more I/O interfaces, wherein the one or more hardware processors are configured by the instructions to: acquire for a current video frame of the live video stream transmitted by a transmitter using an acquisition device, an area of a foveal region and an area of a peripheral region, using a foveal radius of the corresponding current video frame of the live video stream; initialize for each of one or more successive video frames of the live video stream, a quality of the foveal region, a quality of the peripheral region, a foveal breathing parameter, and a maximum desired frame rate; encode spatially at the transmitter, each of the one or more successive video frames of the live video stream, based on the quality of the foveal region, the quality of the peripheral region, the foveal breathing parameter, and the maximum desired frame rate; receive at the transmitter, an instantaneous feedback of a video quality, based on the one or more successive video frames of the live video stream, from a receiver, on a periodic timer expiry; select, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter; adaptively switch, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase; packetize, the one or more encoded successive video frames of the live video stream, into one or more packets, using a packetization technique; transmit, the one or more packets, to the receiver, through an adaptive real-time streaming technique; receive one or more packets, at the receiver; reconstruct the one or more frames from the one or more packets, depending on the encoding scheme employed at the transmitter; reduce the maximum desired frame rate, if an actual bandwidth of the network is not satisfied for transmitting the one or more encoded successive video frames of the live video stream to the receiver; further encode the one or more encoded successive video frames of the live video stream, at the reduced maximum desired frame rate, for transmission; adaptively manage the quality of the foveal region to satisfy an actual bitrate supported by the network; increase the maximum desired frame rate, if the current bandwidth of the network required for transmitting the one or more encoded successive video frames of the live video stream, is less than the actual bandwidth of the network, at the current frame rate; further encode the one or more encoded successive video frames of the live video stream, at the increased maximum desired frame rate, for transmission; and adaptively manage the quality of the foveal region to satisfy the actual bitrate supported by the network.

In yet another aspect, there are provided one or more non-transitory machine-readable information storage mediums comprising one or more instructions which when executed by one or more hardware processors cause: acquiring for a current video frame of the live video stream transmitted by a transmitter using an acquisition device, an area of a foveal region and an area of a peripheral region, using a foveal radius of the corresponding current video frame of the live video stream; initializing for each of one or more successive video frames of the live video stream, a quality of the foveal region, a quality of the peripheral region, a foveal breathing parameter, and a maximum desired frame rate; encoding spatially at the transmitter, each of the one or more successive video frames of the live video stream, based on the quality of the foveal region, the quality of the peripheral region, the foveal breathing parameter, and the maximum desired frame rate; receiving at the transmitter, an instantaneous feedback of a video quality, based on the one or more successive video frames of the live video stream, from a receiver, on a periodic timer expiry; selecting, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter; adaptively switching, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase; packetizing, the one or more encoded successive video frames of the live video stream, into one or more packets, using a packetization technique; transmitting, the one or more packets, to the receiver, through an adaptive real-time streaming technique; receiving one or more packets, at the receiver; reconstructing the one or more frames from the one or more packets, depending on the encoding scheme employed at the transmitter; reducing the maximum desired frame rate, if an actual bandwidth of the network is not satisfied for transmitting the one or more encoded successive video frames of the live video stream to the receiver; further encoding the one or more encoded successive video frames of the live video stream, at the reduced maximum desired frame rate, for transmission; adaptively managing the quality of the foveal region to satisfy an actual bitrate supported by the network; increasing the maximum desired frame rate, if the current bandwidth of the network required for transmitting the one or more encoded successive video frames of the live video stream, is less than the actual bandwidth of the network, at the current frame rate; further encoding the one or more encoded successive video frames of the live video stream, at the increased maximum desired frame rate, for transmission; and adaptively managing the quality of the foveal region to satisfy the actual bitrate supported by the network.

In an embodiment, the instantaneous feedback of the video quality of the live video stream, is an error rate determined based on the video quality of the live video stream.

In an embodiment, adaptively switching the selected encoding scheme between one of two encoder phases (i) the foveal phase, (ii) the peripheral phase, for employing the one or more successive video frames of the live video stream to obtain the one or more encoded successive video frames of the live video stream, is depending on an error rate of the live video stream.

In an embodiment, adaptively switching the selected encoding scheme between one of two encoder phases (i) the foveal phase, (ii) the peripheral phase, based on the feedback received at the transmitter by the receiver, for employing the one or more successive video frames of the live video stream to obtain the one or more encoded successive video frames of the live video stream, is by tuning sequentially (i) the quality of the foveal region, (ii) the foveal breathing parameter, (iii) the maximum desired frame rate, and (iv) the quality of the peripheral region, wherein: firstly, tuning the quality of the peripheral region until the actual bandwidth of the network is satisfied; secondly tuning the foveal breathing parameter until the actual bandwidth of the network is satisfied, while tuning the quality of the peripheral region does not satisfy the actual bandwidth of the network; thirdly, tuning the maximum desired frame rate until the actual bandwidth of the network is satisfied, while tuning the quality of the peripheral region and the foveal breathing parameter does not satisfy the actual bandwidth of the network; and lastly, tuning the quality of the foveal region until the actual bandwidth of the network is satisfied, while tuning the quality of the peripheral region, the foveal breathing parameter, and the maximum desired frame rate does not satisfy the actual bandwidth of the network.

In an embodiment, employing the one or more successive video frames of the live video stream through median based matrix sparsification for bitrate adaptation in the peripheral phase, comprises: (a) determining a change in predominant error rate for each of the one or more successive video frames, wherein the predominant error rate is obtained from the feedback of the instantaneous video quality of the live video stream; (b) obtaining an initial quantized matrix associated with a fundamental coding block for each of the one or more successive video frames of the live video stream; (c) determining a scaling factor, based on (i) the change in predominant error rate for each of the one or more successive video frames using the corresponding initial quantized matrix, and (ii) a predominant error rate threshold, through a median position updation (MPU) algorithm; (d) dividing and multiplying the initial quantized matrix with the scaling factor, to obtain a scaled quantized matrix associated with the fundamental coding block for each of the one or more successive video frames; (e) determining the quality of the peripheral region associated with each of the one or more successive video frames, using the corresponding scaled quantized matrix; and (f) repeating the steps (a) through (e), based on the feedback of the instantaneous video quality of the live video stream and the quality of the peripheral region associated with each of the one or more successive video frames, to obtain the one or more encoded successive video frames of the live video stream.

In an embodiment, employing the one or more successive video frames of the live video stream through foveal breathing for bitrate adaptation in the foveal phase, comprises: obtaining a predominant error rate from the feedback of the instantaneous video quality of the live video stream, to determine a change in the predominant error rate for each of the one or more successive video frames; and performing one of: (i) a foveal shrinking on each of the one or more successive video frames when the change in the predominant error rate is greater than or equal to a predominant error rate threshold, and (ii) a foveal expansion on the each of the one or more successive video frames when the change in the predominant error rate is less than to the predominant error rate threshold, to obtain the one or more encoded successive video frames of the live video stream.

In an embodiment, performing the foveal shrinking on each of the one or more successive video frames when the change in the predominant error rate is greater than or equal to the predominant error rate threshold, comprises: obtaining a current foveal radius percentage factor for each of the one or more successive video frames of the live video stream; determining a successive foveal radius percentage factor for each of the one or more successive video frames, by dividing the corresponding current foveal radius percentage factor with a foveal shrinking factor, if the current foveal radius percentage factor is greater than a minimum foveal radius percentage factor threshold; determining the foveal breathing parameter for each of the one or more successive video frames; and obtaining the one or more encoded successive video frames of the live video stream, by shrinking each of the one or more successive video frames based on the corresponding foveal breathing parameter and using the corresponding successive foveal radius percentage factor.

In an embodiment, performing the foveal expansion on each of the one or more successive video frames when the change in the predominant error rate is less than the predominant error rate threshold, comprises: obtaining a current foveal radius percentage factor for each of the one or more successive video frames of the live video stream; determining a successive foveal radius percentage factor for each of the one or more successive video frames, by adding the corresponding current foveal radius percentage factor with a foveal expansion factor, if the current foveal radius percentage factor is less than to a maximum foveal radius percentage factor threshold; determining the foveal breathing parameter for each of the one or more successive video frames; and obtaining the one or more encoded successive video frames of the live video stream, by expanding each of the one or more successive video frames based on the corresponding foveal breathing parameter and using the corresponding successive foveal radius percentage factor.

In an embodiment, the foveal radius of the video frame of the live video stream, is calculated using an image height, an image width, and a foveal radius percentage factor of the corresponding video frame.

In an embodiment, the foveal radius of the video frame of the live video stream, is calculated using an image height, an image width, and a foveal radius percentage factor of the corresponding video frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 7 illustrates an exemplary flow diagram for employing one or more successive video frames of the live video stream through foveal breathing for bitrate adaptation in a foveal phase to obtain one or more encoded successive video frames of the live video stream, in accordance with some embodiments of the present disclosure.

FIG. 7A illustrates an exemplary flow diagram for performing a foveal shrinking on each of one or more successive video frames when a change in a predominant error rate ΔP is greater than or equal to a predominant error rate threshold $P_{th}$, in accordance with some embodiments of the present disclosure.

FIG. 7B illustrates an exemplary flow diagram for performing a foveal expansion on each of the one or more successive video frames when a change in a predominant error rate ΔP is less than to a predominant error rate threshold $P_{th}$, in accordance with some embodiments of the present disclosure.

FIGS. 8A, 8B, 8C, and 8D illustrates exemplary diagrams for determining the scaling factor S in a median based matrix sparsification technique, for (a) an exemplary video frame, (b) the exemplary video frame with ΔP<Pth making MQNR less sparse (c) the exemplary video frame with ΔP<Pth and $I^S$ becomes 0 making MQNR equal to MSQNR (d) the exemplary video frame with ΔP≥$P_{th}$ performing MQNR sparsification, respectively, in accordance with some embodiments of the present disclosure.

FIG. 11 illustrates an exemplary flow diagram for employing the one or more successive video frames of the live video stream through the median based matrix sparsification for bitrate adaptation in the peripheral phase to obtain the one or more encoded successive video frames of the live video stream, in accordance with some embodiments of the present disclosure.

DETAILED DESCRIPTION

Figure 1:
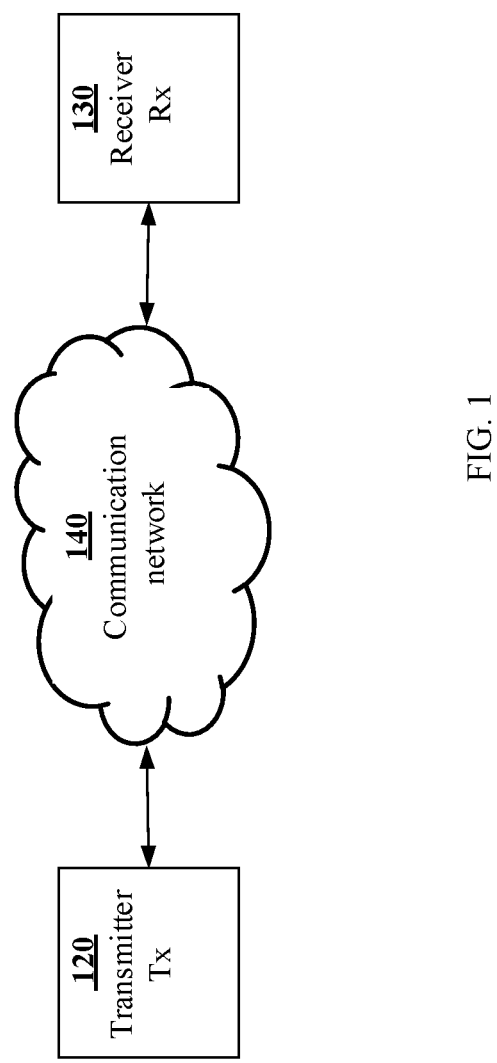
FIG. 1 illustrates an exemplary application scenario for methods and systems of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The performance of any video streaming system combinedly depends on video encoding or decoding and the underlying transportation mechanism. There is a lack of synergy between application-level encoding and the underlying transportation mechanism which have been traditionally dealt as two independent paradigms. Conventional techniques in this area addresses to synergize the encoding with transportation mechanism through a frame-by-frame modification deep inside VP8/VP9 structure. The conventional techniques in this area evolved to satisfy the applications like video on demand but fails to satisfy the requirements for strictly real-time interactive applications While the, it fails to satisfy the requirements for strictly real-time interactive applications. A motion vector (MV) based encoding with Group of Pictures (GoP) as the fundamental encoded unit, is inherently slow reactive and fails to recover partially or fully lost I-frame causes loss of sync leading to freeze and leads to large recovery time due to waiting for the next syncing opportunity.

Applicant's invention called ARV (A-REaLiSTIQ-ViBe) proposes a tight coupling between encoding and transportation mechanism, where a frame-to-frame background subtraction-based temporal encoding is coupled with a custom application packet structure and application protocol. The application protocol follows the essence of Applicant's other invention called Adaptive RESTful Lightweight Streaming for Things (A-REaLiST). The A-REaLiST adds an abstraction layer on Constrained Application Protocol (CoAP) for streaming and adaptively uses the confirmable (CON) and non-confirmable (NON) semantics. The critical packets (critical in terms of its importance in regeneration of the full information at the receiver side) are sent in CON mode and non-critical packets are sent in NON mode with No-response option. The A-REaLiST provides hooks for future applications to maintain balance between reliability and latency.

JPEG encoding includes RGB to YCbCr domain transformation followed by discrete cosine transform (DCT). After the DCT transform quantization is performed which is lossy step followed by Huffman encoding to convert image pixel data into binary information for transmission. Applicant's other invention called A-REaLiSTIQ (A-REaLiST with Improved Quality) reduces the effect of loss on frames by trying to conceal the loss through an error concealment algorithm where the lost Minimum Coded Units (MCUs) are filled with Huffman coded zeroes using the JPEG image header at the receiver side. But both AREaLiST and A-REaLiSTIQ do not have any temporal compression and hence is not bandwidth (BW) efficient and framerate efficient.

Though the solution in ARV proves agility in reaction to channel degradation due to individual frame-based operation, while still compressing the stream temporally, there are shortcomings in terms of practical usage. Apart from the adaptation through state changes, the ARV does not have bitrate adaptation in the spatial domain at source (transmitter side) which would ensure to uphold the QoE requirements while satisfying the channel QoS unlike the conventional ABR schemes.

The present disclosure solves the technical problems in the art for quality of experience (QoE)-centric adaptive bitrate encoding for a live video streaming, by encompassing the typical considerations for delay-sensitive interactive applications. The present disclosure is termed as QuOVADIS which stands for Quality Optimized Visual Anatomy-driven Dynamic and Intrinsically adaptive Streaming. The QuOVADIS is built based on the comprehensive modelling for managing QoE for the concerned applications. The present disclosure solves the critical aspect of maintaining QoE, despite challenging channel condition, for interactive systems such as tele-robotics, that depends on live visual feed from the other end to emanate the suitable actuation command.

The first feature of the present disclosure is comprehensive modelling for managing the QoE besides reactively adapting the bitrate as per the channel condition. The conventional techniques to model the QoE for latency-critical regime, targets only the content distribution with much less delay constraint environments. The present disclosure models the adaptation as a context specific multi-model tuning mechanism. The second feature of the present disclosure is a dual adaptation control for spatial encoding of each frame. This involves defining a starting region of potential attention by the user based on a standard estimate of eye-foveation with respect to the field of view (FOV) and then adapting it through a foveal-breathing technique. Further, a median based sparsification of quantized DCT coefficient matrix for each minimum coded unit (MCU) of a frame is introduced to adapt the bitrate satisfying the channel bit budget without compromising the quality of the foveal region. The sparsification operation is performed in such a reversible manner that the receiver need not have a knowledge of the present foveal region and the associated scaling coefficient.

A video quality-of-experience (QoE) for latency-sensitive interactive applications is modelled as in equation 1:

$$E = f(V_q, P_F, \sigma, \delta, d) \quad (1)$$

wherein, E is an observed QoE in a given time span $\tau$, $V_q$ is an average visual quality of the frames across $\tau$, $P_F$ is a probability of freezing, $\sigma$ is a variance in distance between successive frames, $\delta$ is a gap between the achieved framerate and the desired rate for the present context, and d is a perceived delay with respect to a local actuation.

Apart from $V_q$, the rest are dependent variables influenced by the ratio of present bitrate (b) vs the channel capacity, and the present frame rate (R). In order to maintain E, b cannot be reduced drastically as that would adversely affect $V_q$. So, a reference for $V_q$ is maintained as a constraint and, to practically create a tunable mechanism, the equation 1 need to be redefined as equation 2:

$$E' = f(V_q, R) \quad (2)$$

where $V_q$ is expressed as in equation 3:

$$V_q = \{V_{q_{fov}} \cup V_{q_{per}}\} \quad (3)$$

wherein, $V_{q_{fov}}$ is a quality within the foveal region, $V_{q_{per}}$ is a quality at the peripheral region beyond the foveal region. A ratio $$G = \frac{A}{A'}$$

is redefined where A is an area under foveal region, A' is an area under peripheral region. To maintain QoE, the whole tunable mechanism to be constrained by $V_{q_{fov}}$. G controls the foveal breathing. Thus, the equation 2 is further modified as equation 4:

$$E'' = f(V_{q_{fov}}, V_{q_{per}}, G, R) \quad (4)$$

Thus, the equation 4 equips with four handles for the tuning. Let, $\rho_k \forall k \in \{0, \ldots, 3\}$ denote the priority of operation for each of the components in right hand side of equation 4 respectively. At any instant, based on the present condition, the process should identify the set of indices i such that, $\rho_i > \rho_j$ where $i,j \subseteq \{0, \ldots, 3\}$ and the parameters corresponding to the indices in i are tuned. Under a degrading channel condition, the normally desired sequence of ordering of $\rho_k$ would be as in equation 5:

$$\rho_1 > \rho_2 > \rho_3 > \rho_0 \quad (5)$$

Thus, initially desired bitrate to be achieved by tuning the quality (in terms of quantization) in the peripheral region. Once a limit of matrix sparsity is reached, the foveal breathing is followed by reducing G to achieve the desired bitrate. Then, the frame rate is reduced extrinsically to a certain threshold. Finally, if all the previous tunings do not yield then the quality of the present foveal region needs to be reduced. In ideal case, the reduction of the quality of the foveal region is not exercised. The tuning may also lead to improving all the factors when channel condition improves and in an ideal situation, $V_{q_{fov}} = V_{q_{per}}$.

In the best possible scenario when $V_{q_{per}} \rightarrow V_{q_{fov}}$, $G \rightarrow \infty$.

In the worst scenario when $V_{q_{fov}} \rightarrow V_{q_{per}}$, $G \rightarrow 0$.

FIG. 1 illustrates an exemplary application scenario for methods and systems of the present disclosure. In the exemplary application scenario of FIG. 1, a transmitter Tx 120, a receiver Rx 130, and a communication network 140 having the end-to-end transmission channel are present. The transmitter Tx 120 transmits the video obtained through a video producing unit (not shown in FIG. 1) through the communication network 140 and the receiver Rx 130 receives the video via a video consuming unit (not shown in FIG. 1). The video producing unit may be a video source unit, a video acquisition unit such as camera, video sensor, and so on. The video consuming unit may be the end device where the video is being viewed or displayed.

Referring now to the drawings, and more particularly to FIG. 2 through FIG. 14, where similar reference characters denote corresponding features consistently throughout the figures, there are shown preferred embodiments and these embodiments are described in the context of the following exemplary systems and/or methods.

Figure 2:
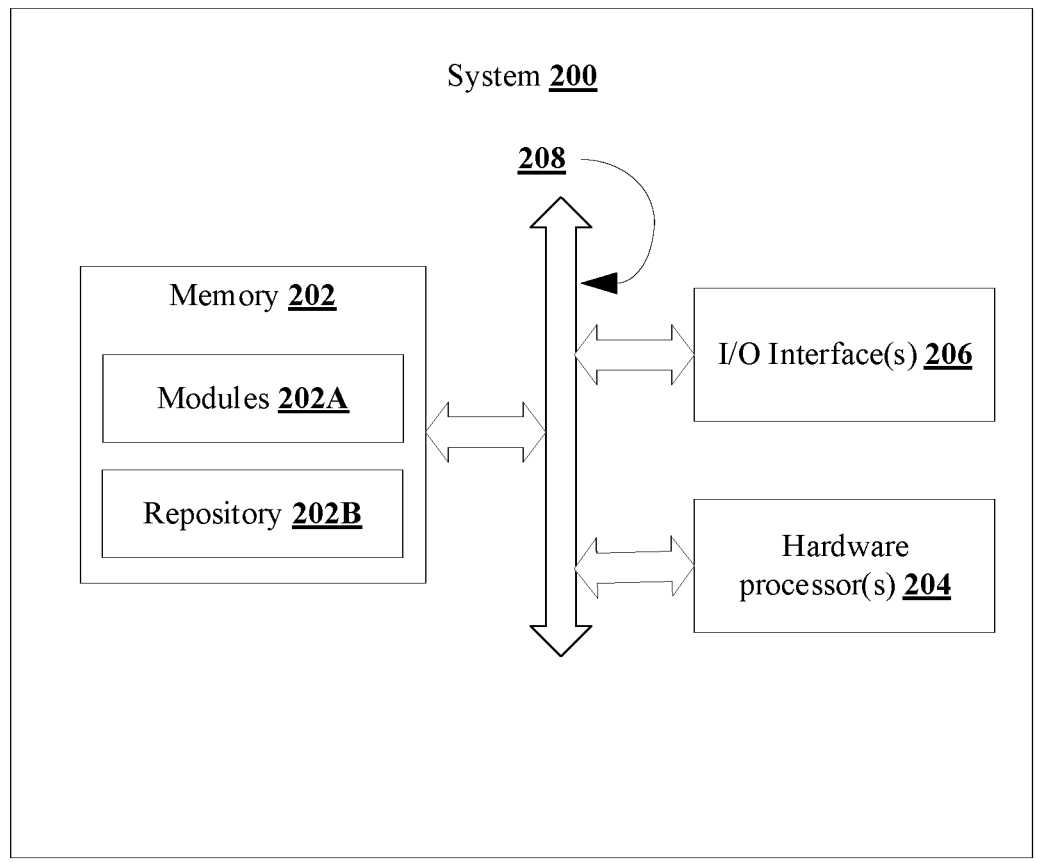
FIG. 2 is an exemplary block diagram of a system for quality of experience (QoE)-centric adaptive bitrate encoding for a live video stream, in accordance with some embodiments of the present disclosure.

FIG. 2 is an exemplary block diagram of a system 200 for quality of experience (QoE)-centric adaptive bitrate encoding for a live video stream, in accordance with some embodiments of the present disclosure. In an embodiment, the system 200 includes or is otherwise in communication with one or more hardware processors 204, communication interface device(s) or input/output (I/O) interface(s) 206, and one or more data storage devices or memory 202 operatively coupled to the one or more hardware processors 204. The one or more hardware processors 204, the memory 202, and the I/O interface(s) 206 may be coupled to a system bus 208 or a similar mechanism.

The I/O interface(s) 206 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 206 may enable the system 200 to communicate with other devices, such as web servers and external databases.

The I/O interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 206 may include one or more ports for connecting a number of computing systems with one another or to another server computer. Further, the I/O interface(s) 206 may include one or more ports for connecting a number of devices to one another or to another server.

The one or more hardware processors 204 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In the context of the present disclosure, the expressions 'processors' and 'hardware processors' may be used interchangeably. In an embodiment, the system 200 can be implemented in a variety of computing systems, such as laptop computers, portable computers, notebooks, hand-held devices, workstations, mainframe computers, servers, a network cloud and the like.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 202 includes a plurality of modules 202a and a repository 202b for storing data processed, received, and generated by one or more of the plurality of modules 202a. The plurality of modules 202a may include routines, programs, objects, components, data structures, and so on, which perform particular tasks or implement particular abstract data types.

The plurality of modules 202a may include programs or computer-readable instructions or coded instructions that supplement applications or functions performed by the system 200. The plurality of modules 202a may also be used as, signal processor(s), state machine(s), logic circuitries, and/or any other device or component that manipulates signals based on operational instructions. Further, the plurality of modules 202a can be used by hardware, by computer-readable instructions executed by the one or more hardware processors 204, or by a combination thereof. In an embodiment, the plurality of modules 202a can include various sub-modules (not shown in FIG. 2). Further, the memory 202 may include information pertaining to input(s)/output(s) of each step performed by the processor(s) 204 of the system 200 and methods of the present disclosure.

The repository 202b may include a database or a data engine. Further, the repository 202b amongst other things, may serve as a database or includes a plurality of databases for storing the data that is processed, received, or generated as a result of the execution of the plurality of modules 202a. Although the repository 202b is shown internal to the system 200, it will be noted that, in alternate embodiments, the repository 202b can also be implemented external to the system 200, where the repository 202b may be stored within an external database (not shown in FIG. 2) communicatively coupled to the system 200. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 202b may be distributed between the system 200 and the external database.

Figure 3A:
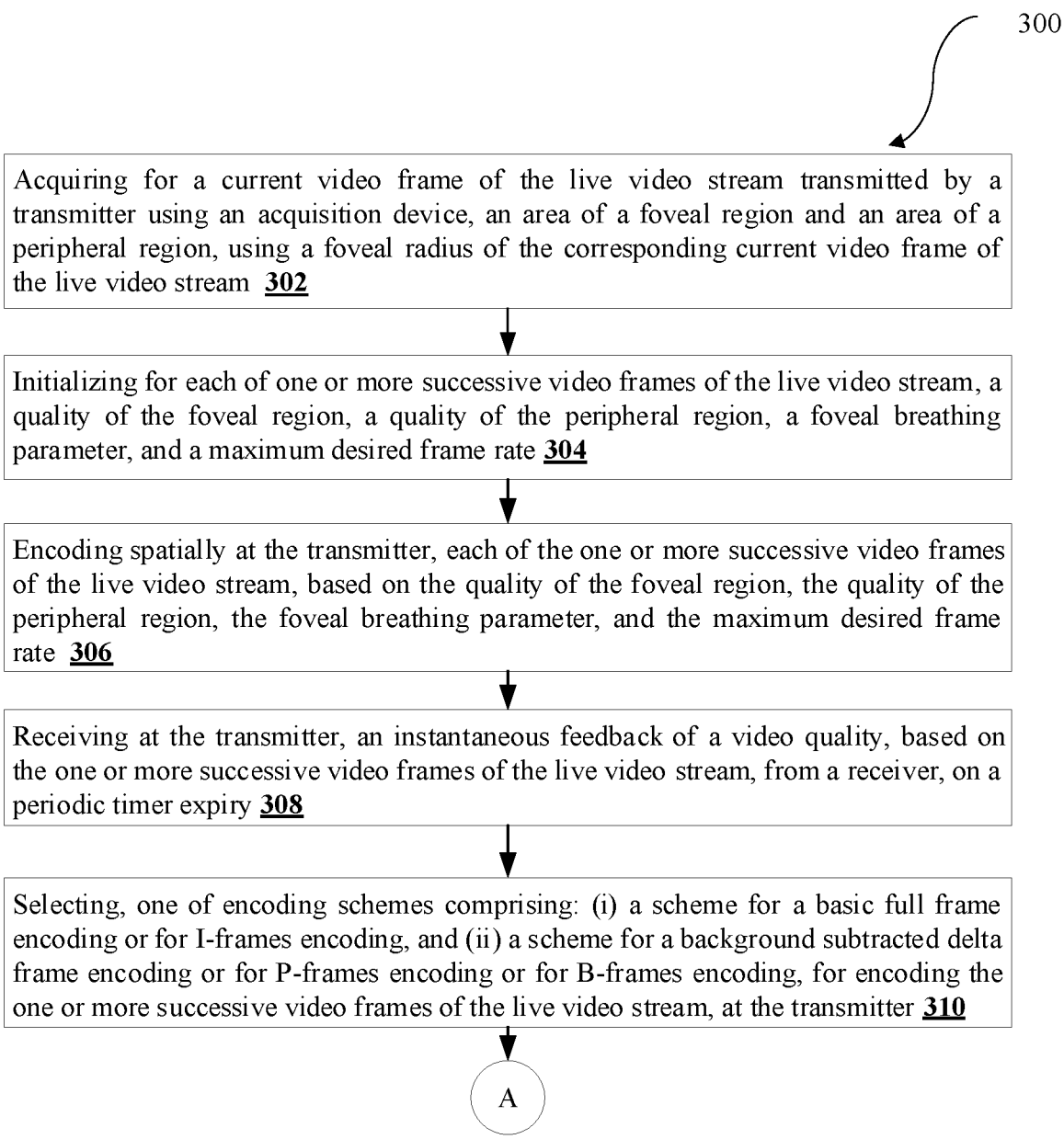
FIGS. 3A, 3B, and 3C illustrates exemplary flow diagrams of a processor-implemented method for quality of experience (QoE)-centric adaptive bitrate encoding for a live video stream, in accordance with some embodiments of the present disclosure.
Figure 3B:
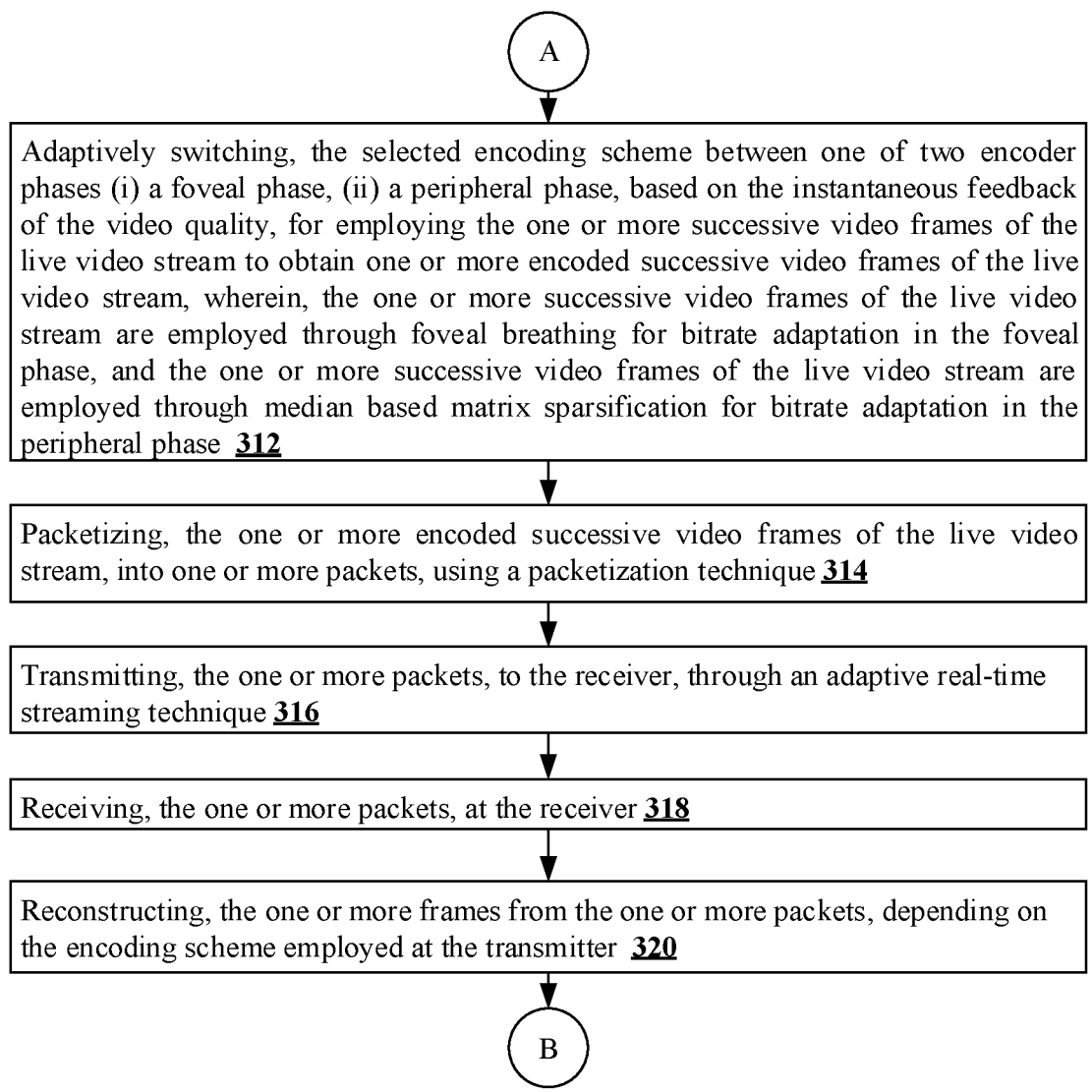
Figure 3C:
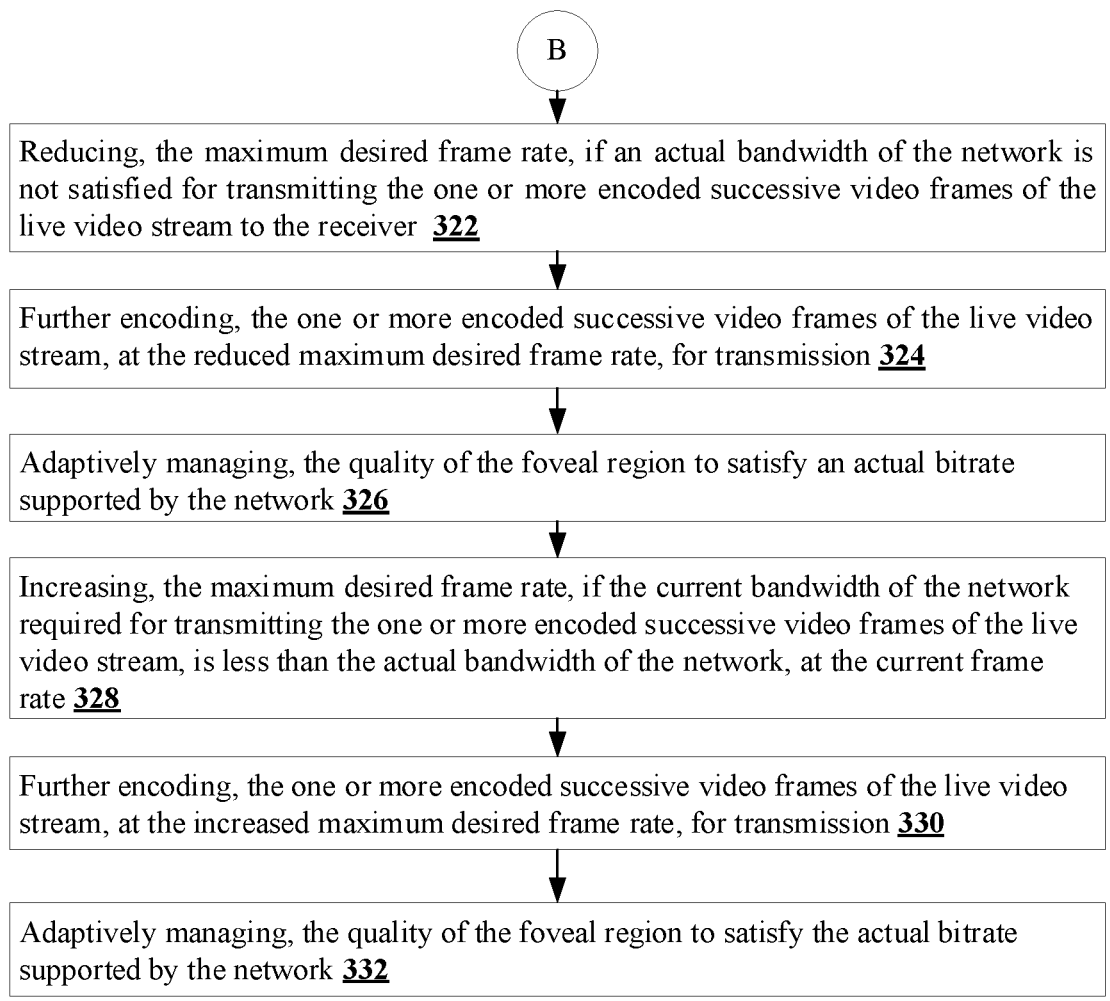

Referring to FIGS. 3A through 3C, components and functionalities of the system 200 are described in accordance with an example embodiment of the present disclosure. For example, FIGS. 3A through 3C illustrates exemplary flow diagrams of a processor-implemented method 300 for quality of experience (QoE)-centric adaptive bitrate encoding for a live video stream, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 204 of the system 200 are configured to acquire an area of a foveal region and an area of a peripheral region for a current video frame of the live video stream transmitted by a transmitter Tx through an acquisition device. The current video frame is the current frame is part of the video, which is to be transmitted, and such video frames forms the video stream. The area of the foveal region and the area of the peripheral region are determined using the foveal radius of the corresponding video frame of the live video stream.

In an embodiment, the foveal radius of the video frame is calculated using an image height, an image width, and a foveal radius percentage factor of the corresponding video frame. Mathematically the foveal radius ($\hat{R}$) of the video frame is calculated using the equation 6:

$$\hat{R} = \text{Max}(\text{Image Height}, \text{Image Width}) \cdot \mu/100 \quad (6)$$

wherein $\mu$ is the foveal radius percentage factor and the typical value of $\mu$ is 40.

Hence the area of the foveal region (A) is calculated using the equation 7:

$$A = \pi \hat{R}^2 \quad (7)$$

The area of the peripheral region (A') is calculated based on total area of the video frame and the area of the foveal region (A), using the equation 8:

$$A' = \text{Area of image} - A \quad (8)$$

Figure 4:
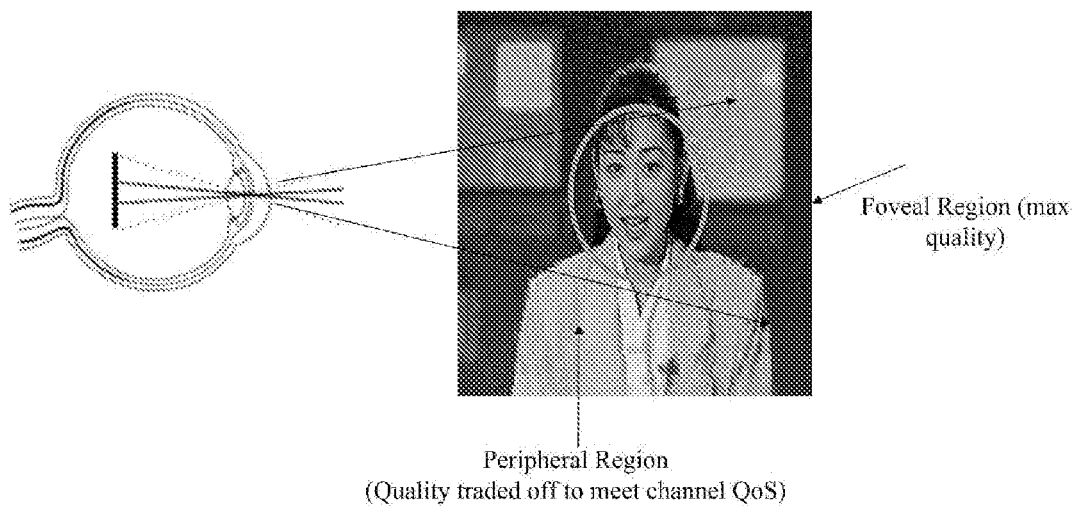
FIG. 4 is an exemplary video frame showing a quality requirement of a foveal region and a peripheral region, in accordance with some embodiments of the present disclosure.

At step 304 of the method 300, the one or more hardware processors 204 of the system 200 are configured to initialize, for each of one or more successive video frames of the live video stream, a quality of the foveal region ($V_{qfov}$), a quality of the peripheral region ($V_{qper}$), a foveal breathing parameter (G), and a maximum desired frame rate (R). FIG. 4 is an exemplary video frame showing a quality requirement of the foveal region and the peripheral region, in accordance with some embodiments of the present disclosure.

The one or more successive video frames of the live video stream are the video frames to be transmitted next to the current video frame mentioned at step 302 of the method 300. The foveal breathing parameter (G) for each video frame is a ratio of the area of the foveal region (A) to the area of the peripheral region (A'), and is mathematically represented as in equation 9:

$$G = \frac{A}{A'} \quad (9)$$

In an embodiment, a typical initial value for quality of the foveal region ($V_{qfov}$) is 90%, the typical initial value for quality of the peripheral region ($V_{qper}$) is 50% and the typical initial value for the maximum desired frame rate (R) is 10 frames per second (fps).

At step 306 of the method 300, the one or more hardware processors 204 of the system 200 are configured to encode each of the one or more successive video frames of the live video stream, spatially, based on the initial values of the quality of the foveal region ($V_{qfov}$), the quality of the peripheral region ($V_{qper}$), the foveal breathing parameter (G), and the maximum desired frame rate (R), as initialized at step 304 of the method 300. The spatial encoding is performed at the initial network conditions at the transmitter side Tx.

At step 308 of the method 300, the one or more hardware processors 204 of the system 200 are configured to receive instantaneous feedback of a video quality, from the receiver Rx, upon an expiry of a periodic timer present at the receiver Rx. The instantaneous feedback of a video quality is assessed based on the quality of the one or more successive video frames of the live video stream mentioned at step 306 of the method 300, when such one or more successive video frames are transmitted to the receiver side Rx. In an embodiment, the instantaneous feedback of the video quality of the live video stream, is an error rate which is determined based on the video quality of the live video stream.

In an embodiment, the transmitter Tx in the present disclosure maintains the periodic timer as present in ARV of the applicant. On expiry of the periodic timer the transmitter Tx, transmits the first packet of the present frame in flight in CON (Confirmable) mode, but with no retransmission. The tuning decision in optimizing the QoE depends on the periodic feedbacks. At each playout interval t, the receiver Rx determines the total number of expected packets for each frame by parsing the offset field of first packet containing the position indicator for the last packet in the frame. The receiver Rx uses this information to compute an Instantaneous Error Rate $I^t$ using the following equation 10:

$$I^t := \frac{N_{lost}}{N_{total}} \times 100 \quad (10)$$

Using $I^t$, the receiver Rx computes a Cumulative error rate $C_{mk}^t := I^t + C_{mk}^{t-1}$ which indicates accumulated error between two instances of receiving CON packets. Additionally, the receiver Rx maintains a log of $I^t$ at time t marking the end of present play-out interval. Whenever the receiver Rx receives a CON packet on periodic timer expiry, it computes a predominant Error Rate $P^t := Mode(I^t, I^{t-1}, \ldots, I^{t-k})$ where $P^t$ indicates the most frequent Error Rate within the interval t and t−k, where t−k is the time when the receiver Rx last received a CON packet. The receiver Rx piggybacks $C_{mk}^t$ and $P^t$ with ACK of CON packet.

At step 310 of the method 300, the one or more hardware processors 204 of the system 200 are configured to select one of encoding schemes includes: (i) a scheme for a basic full frame encoding or for I-frames encoding (a basic mode), and (ii) a scheme for a background subtracted delta frame encoding or for P-frames encoding or for B-frames encoding (a delta mode), for encoding the one or more successive video frames of the live video stream, at the transmitter Tx. In an embodiment, the selection of one of the encoding schemes is based on the instantaneous feedback of a video quality received at step 308 of the method 300. Each of the encoding schemes employs a respective encoder at the transmitter Tx for performing the encoding process.

Figure 5:
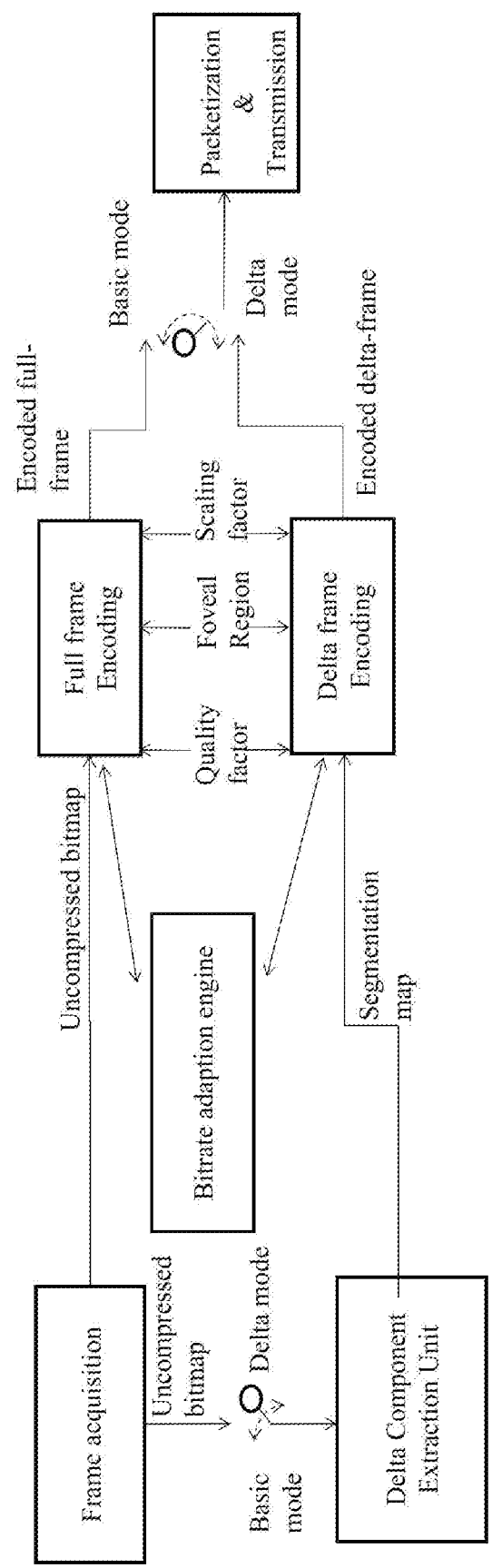
FIG. 5 is an exemplary architecture diagram including QoE-aware spatial and temporal encoding at a transmitter, in accordance with some embodiments of the present disclosure.

FIG. 5 is an exemplary architecture diagram including QoE-aware spatial and temporal encoding at a transmitter, in accordance with some embodiments of the present disclosure. The transmitter Tx adaptively switches between two modes namely a basic full frame encoding (a basic mode) and a background subtracted delta frame encoding (a delta mode). In the basic full frame encoding (basic mode), the transmitter Tx transmits a full JPEG frame whereas in the background subtracted delta frame encoding (delta mode), the transmitter Tx transmits just the foreground information in a frame as a delta encoded frame. For a full frame, the first packet is transmitted via CON mode whereas rest of the packets are sent via NON mode with No Response option. All the packets of a Delta frame are sent via NON mode with No Response option. Hence Full frame takes more time than Delta encoded frame hence has to be transmitted at lower fps than Delta frame.

Further, the transmitter Tx analyses the Cumulative error rate $C_{mk}^t$ obtained in periodic timer feedback from the receiver Rx. If the Cumulative error rate $C_{mk}^t$ crosses a predefined threshold value, then the transmitter Tx switches to basic full frame encoding from the background subtracted delta frame encoding transmitting full frame thereby switching to lower frames per second (fps).

At step 312 of the method 300, the one or more hardware processors 204 of the system 200 are configured to adaptively switch the selected encoding scheme at step 310 of the method 300 between one of two encoder phases (i) a foveal phase, (ii) a peripheral phase, for employing the one or more successive video frames of the live video stream. The adaptive switching the selected encoding scheme between one of two encoder phases (i) the foveal phase, (ii) the peripheral phase, is based on the instantaneous feedback of the video quality received from the receiver Rx. In another words, the adaptive switching the selected encoding scheme between one of two encoder phases (i) the foveal phase, (ii) the peripheral phase, is depending on the error rate of the live video stream (determined based on the video quality, which is received on the expiry of the periodic timer).

The one or more encoded successive video frames of the live video stream is obtained after employing the encoding scheme on the one or more encoded successive video frames of the live video stream, and after the encoder phase. The spatial encoding is performed by adaptively switching between the encoder phase by tuning sequentially (i) the quality of the foveal region ($V_{qfov}$) of the current video frame, (ii) the foveal breathing parameter (G), of the current video frame, (iii) the maximum desired frame rate (R) of the current video frame, and (iv) the quality of the peripheral region ($V_{qper}$) of the current video frame, of the one or more successive video frames.

More precisely, firstly, tuning the quality of the peripheral region ($V_{qper}$) is performed, until the actual bandwidth of the network is satisfied. Secondly, tuning the foveal breathing parameter (G) is performed until the actual bandwidth of the network is satisfied, while tuning the quality of the peripheral region ($V_{qper}$) does not satisfy the actual bandwidth of the network (the first condition is not satisfied). Thirdly, tuning the maximum desired frame rate (R) is performed until the actual bandwidth of the network is satisfied, while tuning the quality of the peripheral region ($V_{qper}$) and the foveal breathing parameter (G) does not satisfy the actual bandwidth of the network (the first condition and the second condition are not satisfied). Lastly, tuning the quality of the foveal region ($V_{qfov}$) is performed until the actual bandwidth of the network is satisfied, while tuning the quality of the peripheral region ($V_{qper}$), the foveal breathing parameter (G), and the maximum desired frame rate (R) does not satisfy the actual bandwidth of the network (the first condition, the second condition and third condition are not satisfied).

Figure 6:
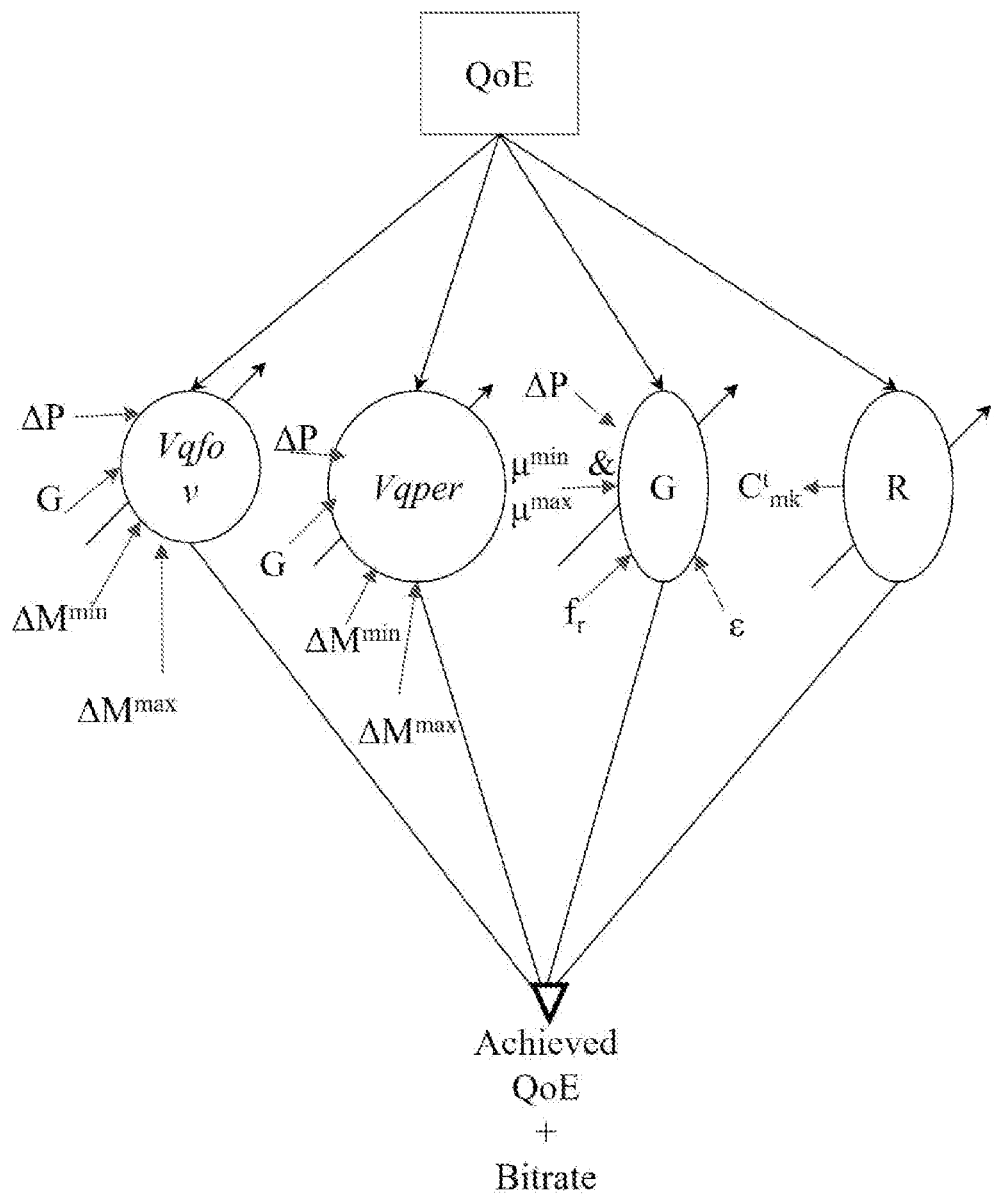
FIG. 6 is an exemplary flow diagram showing a tuning of parameters comprising a quality of the foveal region, a quality of the peripheral region, a foveal breathing parameter, and a maximum desired frame rate, to achieve QoE, in accordance with some embodiments of the present disclosure.
Figure 8B:
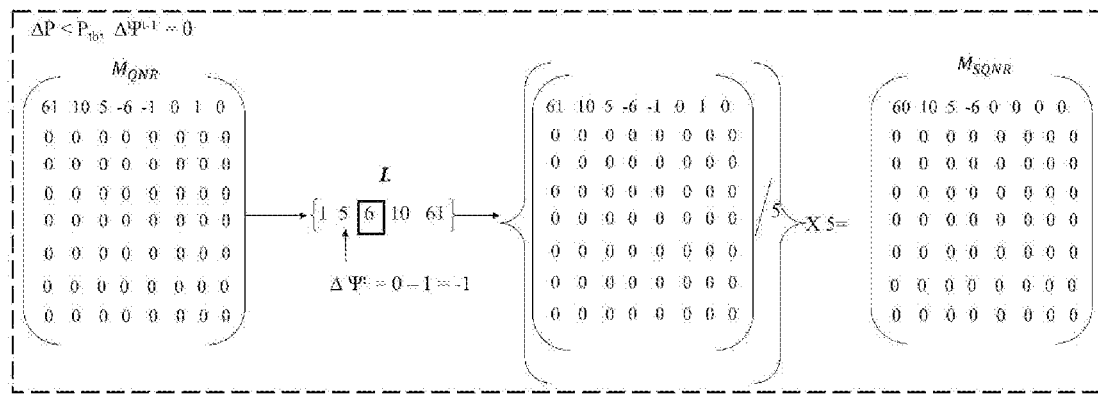
Figure 8C:
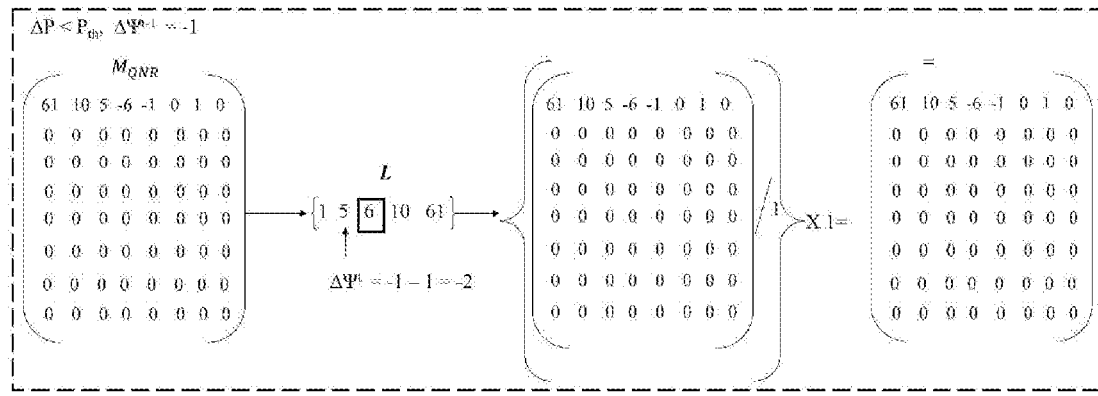
Figure 8D:
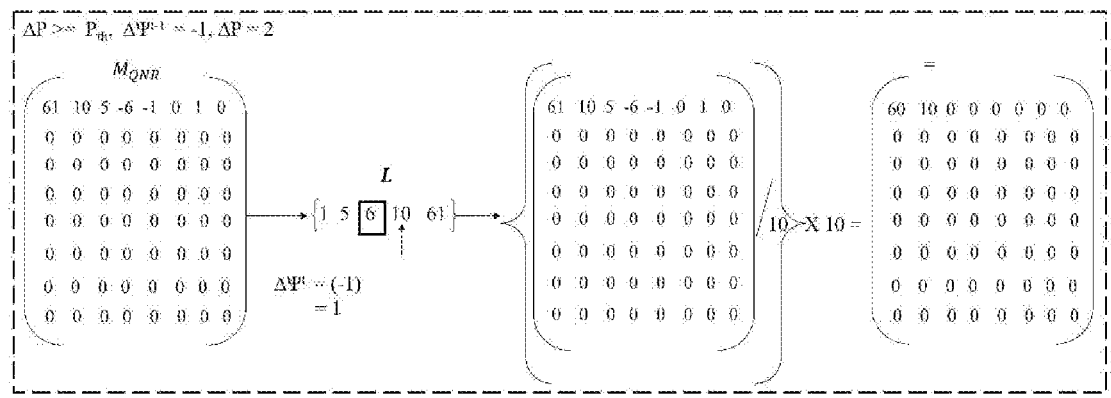

The transmitter Tx based on the instantaneous feedback quality received from the receiver Rx, computes change in the Predominant Error Rate $$\Delta P := \frac{P^t - P^{t-k}}{P^{t-k}}$$

which controls the adaptation phase. Depending on whether $\Delta P$ crosses a predefined threshold $P_{th}$, the Encoder (the basic full frame encoding, or the background subtracted delta frame encoding) in the transmitter Tx adaptively switches between two the foveal phase and the peripheral phase. Initially the encoder is in the peripheral phase thus initially the desired bitrate to be achieved by tuning the quality (in terms of quantization) in the peripheral region ($V_{qper}$). If channel conditions degrade, then first the quality of the peripheral region ($V_{qper}$) is degraded. Once the quality of the peripheral region ($V_{qper}$) can't degrade further but channel conditions keep on deteriorating, then the adaption phase is switched to the foveal phase by reducing the bitrate by performing the foveal shrinking. Once channel conditions keep on improving, then first the quality of the foveal region ($V_{qfov}$) is enhanced by performing the foveal expansion to expand the foveal region to a desired level. If channel conditions further improve, then encoder switches to peripheral phase to improve the quality of the peripheral region ($V_{qper}$). FIG. 6 is an exemplary flow diagram showing the tuning of parameters comprising the quality of the foveal region ($V_{qfov}$), the quality of the peripheral region ($V_{qper}$), the foveal breathing parameter (G), and the maximum desired frame rate (R), to achieve the QoE, in accordance with some embodiments of the present disclosure.

The tuning of the tunable parameters, (i) the quality of the foveal region ($V_{qfov}$), (ii) the foveal breathing parameter (G), (iii) the maximum desired frame rate (R), and (iv) the quality of the peripheral region ($V_{qper}$), is performed to achieve the QoE of the user while satisfying the channel QoS. Each tunable parameter is enabled while the previous tunable parameter does not yield the QoE of the user while satisfying the channel QoS.

Once in the foveal phase, no bitrate adaptation is performed in the peripheral region and the peripheral region is encoded at the minimum quality. In the foveal phase, a foveal breathing is performed which includes foveal shrinking and a foveal expansion. Foveal region is defined as the circle of radius $\hat{R}$ which is explained at step 302 of the method 300.

The one or more successive video frames of the live video stream are employed through foveal breathing for bitrate adaptation in the foveal phase, to obtain the one or more encoded successive video frames of the live video stream. FIG. 7 illustrates an exemplary flow diagram for employing the one or more successive video frames of the live video stream through foveal breathing for bitrate adaptation in the foveal phase to obtain the one or more encoded successive video frames of the live video stream, in accordance with some embodiments of the present disclosure.

As shown in FIG. 7, at step 702, a predominant error rate $P^t$ is obtained from the feedback of the instantaneous video quality of the live video stream, to determine the change in the predominant error rate $\Delta P$ for each of the one or more successive video frames. Then, at step 704, one of: (i) a foveal shrinking, and (ii) a foveal expansion, is performed on each of the one or more successive video frames, based on the change in the predominant error rate $\Delta P$, to obtain the one or more encoded successive video frames of the live video stream. In an embodiment, the foveal shrinking is performed on each of the one or more successive video frames when the change in the predominant error rate $\Delta P$ is greater than or equal to a predominant error rate threshold $P_{th}$. In another embodiment, the foveal expansion is performed on each of the one or more successive video frames when the change in the predominant error rate $\Delta P$ is less than to the predominant error rate threshold $P_{th}$. In an embodiment, the exemplary value for the predominant error rate threshold $P_{th}$ is 10%.

Under the degraded channel conditions, the foveal shrinking (foveal region shirking) is performed by dividing the foveal radius percentage factor $\mu$ by a factor $f_r$ till a predefined threshold $\mu_{min}$ is reached. The foveal shrinking reduces the pixels in the foveal region encoded at high quality and pushes the pixels which were earlier in the foveal region into the peripheral region encoded at lesser quality. The foveal expansion is performed when channel conditions are improving, and current channel bandwidth can support an improved bitrate. The foveal expansion is performed by adding the foveal radius percentage factor $\mu$ with a scalar $\varepsilon$ till $\mu$ reaches a predefined threshold $\mu_{max}$.

FIG. 7A illustrates an exemplary flow diagram for performing the foveal shrinking on each of the one or more successive video frames when the change in the predominant error rate $\Delta P$ is greater than or equal to the predominant error rate threshold $P_{th}$, in accordance with some embodiments of the present disclosure. As shown in FIG. 7A, at step 704a1, a current foveal radius percentage factor $\mu$ for each of the one or more successive video frames of the live video stream is obtained. Next, at step 704a2, a successive foveal radius percentage factor $\mu$ for each of the one or more successive video frames, is determined by dividing the corresponding current foveal radius percentage factor $\mu$ with a foveal shrinking factor $f_r$, if the current foveal radius percentage factor $\mu$ is greater than a minimum foveal radius percentage factor threshold $\mu_{min}$. In an embodiment, the exemplary value of the minimum foveal radius percentage factor threshold $\mu_{min}$ is 0%. Further, at step 704a3, the foveal breathing parameter G is determined for each of the one or more successive video frames. Lastly, at step 704a4, the shrinking of each of the one or more successive video frames is performed, based on the corresponding foveal breathing parameter G and using the corresponding successive foveal radius percentage factor $\mu$ to obtain the one or more encoded successive video frames of the live video stream.

FIG. 7B illustrates an exemplary flow diagram for performing the foveal expansion on each of the one or more successive video frames when the change in the predominant error rate $\Delta P$ is less than to the predominant error rate threshold $P_{th}$, in accordance with some embodiments of the present disclosure. As shown in FIG. 7B, first, at step 704b1, a current foveal radius percentage factor µ is obtained for each of the one or more successive video frames of the live video stream. Then, at step 704b2, a successive foveal radius percentage factor µ is determined for each of the one or more successive video frames, by adding the corresponding current foveal radius percentage factor µ with a foveal expansion factor ε, if the current foveal radius percentage factor µ is less than to a maximum foveal radius percentage factor threshold $\mu_{max}$. In an embodiment, the exemplary value of the maximum foveal radius percentage factor threshold $\mu_{max}$ is 50%. Further, at step 704b3, the foveal breathing parameter is determined for each of the one or more successive video frames. Lastly, at step 704b4, the foveal expansion of each of the one or more successive video frames is performed, based on the corresponding foveal breathing parameter G and using the corresponding successive foveal radius percentage factor.

When in the peripheral phase, the foveal region is encoded at maximum quality. In this phase, the bitrate adaptation of the frame is performed using median based matrix sparsification (Median Based Variable Quantization Matrix Sparsification) in only the Peripheral region of the frame.

JPEG Quantization:

In a JPEG frame, pixels are first converted from RGB to YCbCr domain, and then are divided into Minimum Coded Unit (MCU) which are blocks of 8×8 pixels. Each MCU is first modified using Discrete Cosine Transform. Then each MCU is quantized by dividing it with quantization tables present in the corresponding JPEG frame header. Then Huffman encoding is performed to convert the pixel information in MCU blocks to binary information for transmission.

Median Based Matrix Sparsification:

The pixels in the foveal region are quantized using normal quantization tables. The pixels in the peripheral region are first quantized using normal quantization tables to form quantized matrix $M_{QNR}$ which is then made sparser using a scaling factor S to form $M_{SQNR}$ as per $$M_{SQNR} = \left\lceil \left(\frac{M_{QNR}}{S}\right) \times S \right\rceil.$$

The quantized DCT coefficients which became zero as a result of scaling could not be recovered back but the non-zero values are restored back after multiplication with S such that they are close to original values thereby increasing the number of zeroes in the quantized matrix. This reduces the number of bits allocated to the peripheral region without compromising with the foveal region quality to satisfy the Instantaneous channel bit budget.

Determination of Scaling Factor:

FIG. 8A through 8D illustrates exemplary diagrams for determining the scaling factor S in a median based matrix sparsification technique, for (a) an exemplary video frame, (b) the exemplary video frame with ΔP<Pth making MQNR less sparse (c) the exemplary video frame with ΔP<Pth and $I^S$ becomes 0 making MQNR equal to MSQNR (d) the exemplary video frame with $\Delta P \geq P_{th}$ performing MQNR sparsification, respectively, in accordance with some embodiments of the present disclosure. For each quantized matrix $M_{QNR}$ in a frame, a sorted list L containing absolute of all non-zero and non-repeating quantized DCT coefficients in the quantized matrix $M_{QNR}$ is maintained. At, the start of the streaming, the scaling factor S is the median of the sorted list L. Under deteriorating channel conditions, the scaling factor S is shifted towards the right of the median making the matrix sparser thus providing the peripheral quality degradation whereas for improving channel conditions the scaling factor S is shifted towards left of the median making the matrix comparatively less sparse providing the peripheral quality enhancement.

The scaling factor S is obtained from the list L. itself where its index $I^S$ is computed by adding a factor ΔM to median position M in L. ΔM is the variable factor and is hence called the Median position increment or decrement factor.

Figure 9:
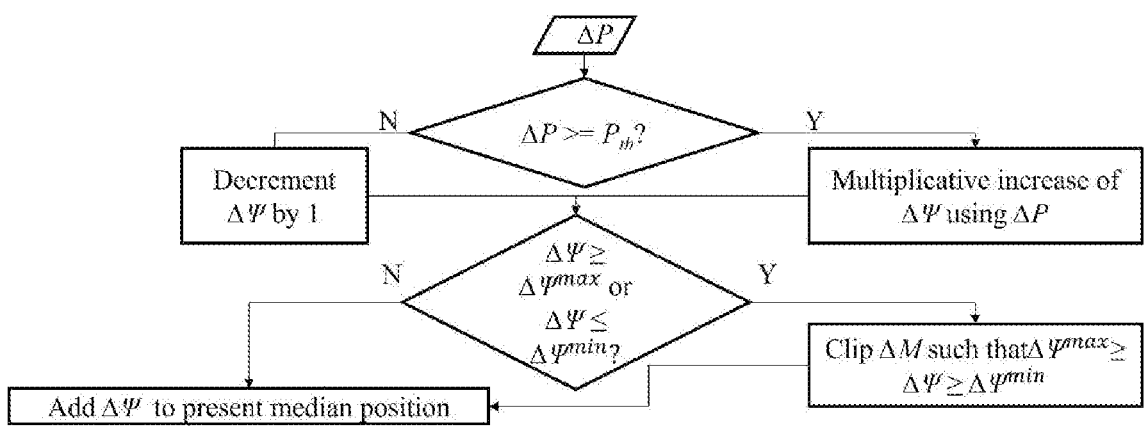
FIG. 9 illustrates an exemplary flow diagram for employing a median position updation (MPU) algorithm in a median based matrix sparsification for bitrate adaptation in peripheral phase, in accordance with some embodiments of the present disclosure.

FIG. 9 illustrates an exemplary flow diagram for employing a median position updation MPU) algorithm in a median based matrix sparsification for bitrate adaptation in peripheral phase, in accordance with some embodiments of the present disclosure. The change in the predominant error rate $\Delta P < P_{th}$ implies either the channel quality has improved, or degradation (if at all) is within the predominant error threshold as set by $P_{th}$. Then ΔM is decremented by 1. Whereas under degrading channel conditions ΔM is multiplicatively increased as per $\Delta M^t = \Delta M^{t-1} + (|\Delta M^{t-1}| * \text{ceil}(\Delta P)))$ using a median position updation (MPU) algorithm.

Figure 10:
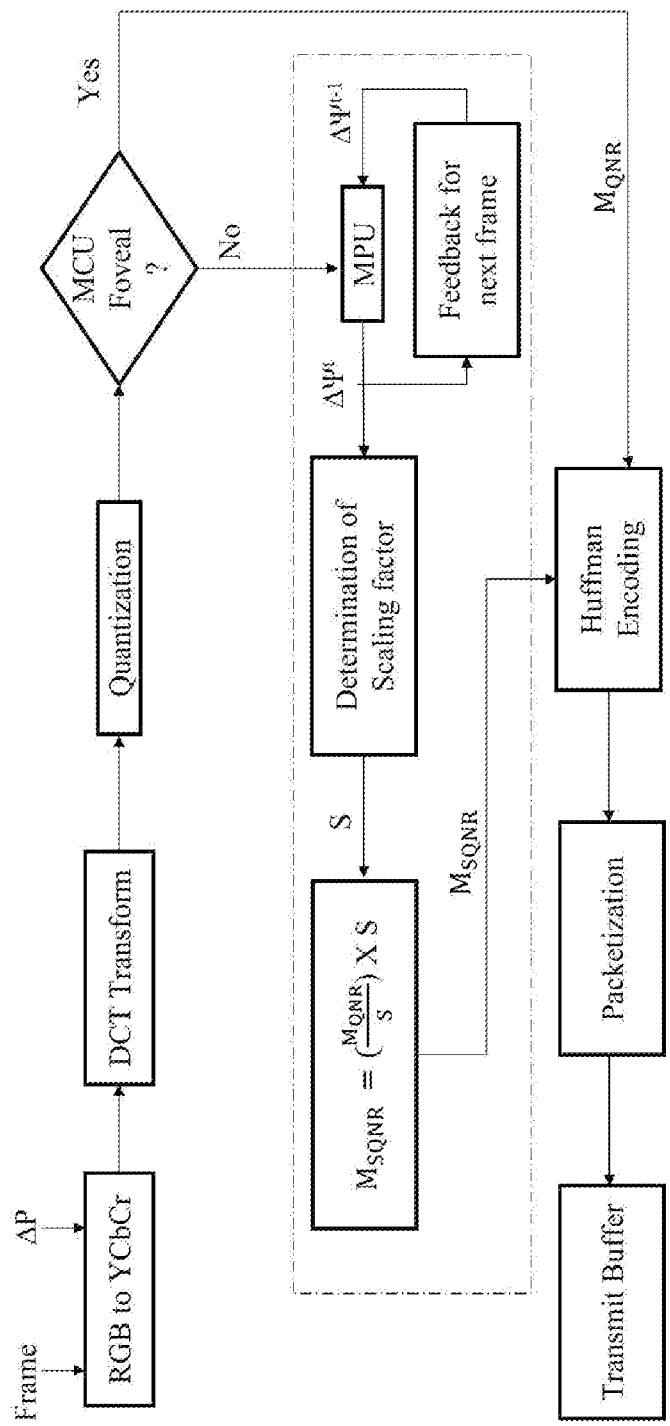
FIG. 10 illustrates an exemplary flow diagram for employing the median based matrix sparsification for bitrate adaptation in peripheral phase using the median position updation (MPU) algorithm, in accordance with some embodiments of the present disclosure.
Figure 12:
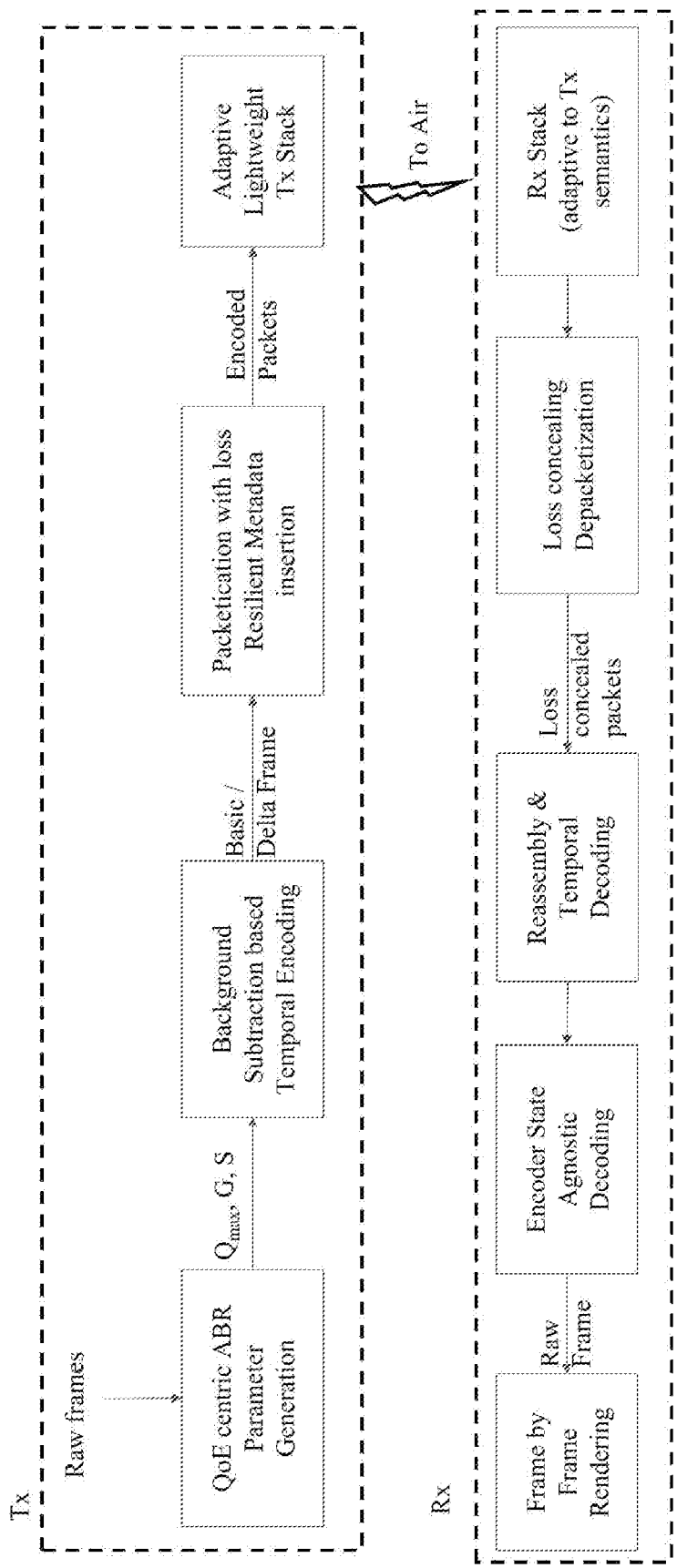
FIG. 12 illustrates an exemplary flow diagram of the processor-implemented method for quality of experience (QoE)-centric adaptive bitrate encoding and decoding, for the live video stream at a transmitter side and a receiver side respectively, in accordance with some embodiments of the present disclosure.

FIG. 10 illustrates an exemplary flow diagram for employing the median based matrix sparsification for bitrate adaptation in peripheral phase using median position updation MPU) algorithm, in accordance with some embodiments of the present disclosure. FIG. 11 illustrates an exemplary flow diagram for employing one or more successive video frames of a live video stream through median based matrix sparsification for bitrate adaptation in peripheral phase to obtain the one or more encoded successive video frames of the live video stream, in accordance with some embodiments of the present disclosure. As shown in FIG. 11, at step 1102, a change in predominant error rate ΔP is determined for each of the one or more successive video frames using the predominant error rate P. The predominant error rate P is obtained from the feedback of the instantaneous video quality of the live video stream as explained at step 308 of the method 300. At step 1104, an initial quantized matrix $M_{QNR}$ associated with a fundamental coding block is determined for each of the one or more successive video frames of the live video stream.

Next, at step 1106, a scaling factor S is determined, based on (i) the change in predominant error rate ΔP for each of the one or more successive video frames using the corresponding initial quantized matrix $M_{QNR}$, and (ii) the predominant error rate threshold $P_{th}$, through the median position updation (MPU) algorithm. In an embodiment, the exemplary value of the predominant error rate threshold $P_{th}$ is 10%. Further, at step 1108, the initial quantized matrix $M_{QNR}$, obtained at step B, is divided and multiplied with the scaling factor S determined at step 1106, to obtain a scaled quantized matrix $M_{SQNR}$ associated with the fundamental coding block for each of the one or more successive video frames.

Further, at step 1110, the quality of the peripheral region ($V_{qper}$) associated with each of the one or more successive video frames, is determined using the corresponding scaled quantized matrix $M_{SQNR}$. Lastly, at step 1112, the steps (1102) through (1110) are repeated, based on the feedback of the instantaneous video quality of the live video stream and the quality of the peripheral region ($V_{qper}$) associated with each of the one or more successive video frames, to obtain the one or more encoded successive video frames of the live video stream.

Below is an exemplary pseudo code for employing the video frames of the live video stream through the foveal breathing for bitrate adaptation in the foveal phase and through the median based matrix sparsification for bitrate adaptation in the peripheral phase:

```
Input: ΔP, P_th, B, μ, μ_min, μ_max, f_r, ΔM^(t-1), ΔM^max, ΔM^min, ε
IF ΔP ≥ P_th THEN
|  IF B == True THEN
|  |  IF μ > μ_min THEN
|  |  |    μ = μ/f_r
|  |  END IF
|  ELSE
|  |
|  |  IF ΔM^(t-1) == ΔM^max THEN
|  |  |  B = TRUE
|  |  |    μ = μ/f_r
|  |  ELSE
|  |  |  ΔM^t = MPU(ΔM^(t-1), ΔP)
|  |  |
|  |  END IF
|  END IF
ELSE
|  IF B == True THEN
|  |  IF μ ≥ μ_max THEN
|  |  |  B = FALSE
|  |  |  ΔM^t = MPU(ΔM^(t-1), ΔP)
|  |  ELSE
|  |  |  μ = μ + ε
|  |  END IF
|  ELSE
|  |  IF ΔM^(t-1) > ΔM^min THEN
|  |  |  ΔM^t = MPU(ΔM^(t-1), ΔP)
|  |  END IF
|  END IF
END IF
```

At step 314 of the method 300, the one or more hardware processors 204 of the system 200 are configured to packetize the one or more encoded successive video frames of the live video stream obtained at step 312 of the method 300, into one or more packets, using a packetization technique. The packetization technique converts the one or more encoded successive video frames of the live video stream, into one or more packets to facilitate reconstruction and error concealment of the video frames at the receiver Rx.

At step 316 of the method 300, the one or more hardware processors 204 of the system 200 are configured to transmit the one or more packets obtained at step 314 of the method 300, to the receiver Rx, through an adaptive real-time streaming technique. In an embodiment, the adaptive real-time streaming technique may employ the A-REaLiSTIQ-ViBe (ARV) of the applicant for transmitting the one or more packets belonging to a delta encoded JPEG frame. In another embodiment, the adaptive real-time streaming technique may employ the A-REaLiSTIQ of the applicant for transmitting the one or more packets (full JPEG frames). Further, in another embodiment, the adaptive real-time streaming technique may employ any other real-time adaptive streaming protocol for the transmission.

At step 318 of the method 300, the one or more hardware processors 204 of the system 200 are configured to receive the one or more packets sent by the transmitter Tx at step 316 of the method 300, at the receiver Rx. The one or more packets received are of encoded video frames obtained through the selected encoding scheme and the encoder phase.

At step 320 of the method 300, the one or more hardware processors 204 of the system 200 are configured to reconstruct the one or more frames from the one or more packets, depending on the encoding scheme employed at the transmitter Tx at step 310 of the method 300 for the live video streaming. FIG. 11 illustrates an exemplary flow diagram of the processor-implemented method for quality of experience (QoE)-centric adaptive bitrate encoding for a live video stream at the transmitter side Tx and the receiver side Rx, in accordance with some embodiments of the present disclosure.

At once instance after the step of 320 of the method 300, if an actual bandwidth of the network is not satisfied for transmitting the one or more encoded successive video frames of the live video stream to the receiver Rx, then at step 322 of the method 300, the one or more hardware processors 204 of the system 200 are configured to reduce the maximum desired frame rate to the extent until the actual bandwidth of the network is satisfied.

Then at step 324 of the method 300, the one or more encoded successive video frames of the live video stream obtained after reducing maximum desired frame rate at step 322 of the method 300, are further encoded via the one or more hardware processors 204 using the selected encoding scheme and through the suitable encoder phase, for the transmission. Further, at step 326 of the method 300, the one or more hardware processors 204 of the system 200 are configured to adaptively manage the quality of the foveal region to satisfy the actual bitrate supported by the network.

At once instance after either the step of 320 of the method 300 or the step 326 of the method 300, if the current bandwidth of the network required for transmitting the one or more encoded successive video frames of the live video stream, is less than the actual bandwidth of the network, at the current frame rate, then at step 328 of the method 300, the one or more hardware processors 204 of the system 200 are configured to increase the maximum desired frame rate to the extent until the actual bandwidth of the network is satisfied.

Then at step 330 of the method 300, the one or more encoded successive video frames of the live video stream obtained after increasing the maximum desired frame rate at step 328 of the method, are further encoded via the one or more hardware processors 204 using the selected encoding scheme and through the suitable encoder phase, for the transmission. Further, at step 332 of the method 300, the one or more hardware processors 204 of the system 200 are configured to adaptively manage the quality of the foveal region to satisfy the actual bitrate supported by the network.

Thus, the steps 308 through 332 of the method 300 are repeated by tuning the parameters as explained at step 312 of the method 300, to achieve the QoE of the user within the actual bandwidth of the network for the delay-sensitive interactive applications.

Hence, the present disclosure provides the tuning mechanism between the quality of the foveal region ($V_{qfov}$), the quality of the peripheral region ($V_{qper}$), the foveal breathing parameter (G), and the maximum desired frame rate (R), based on the feedback or the error rate and with the limited available bandwidth to achieve the QoE centric adaptive bitrate encoding for a live video streaming. The present disclosure solves the critical aspect of maintaining QoE, despite challenging channel condition, for interactive systems such as tele-robotics, that depends on live visual feed from the other end to emanate the suitable actuation command.

The present disclosure provides the new paradigm for live bit-rate adaptive video streaming while keeping the QoE at the focal point. It shows a frugal-yet-practical quality conscious spatiotemporal encoding scheme driven by the anatomy of visual perception by humans. The agile loss resiliency and robustness of the present disclosure is powered by a lightweight and robust proto-col that functions in close tandem with the end-application. The efficacy is proved in a real-life varying network environment. The present disclosure also has shown much stability in latency at low radio signal strength zone than GoP based adaptive streaming protocols.

Example Scenario:

The methods and the systems of the present disclosure is implemented on C++ using OpenCV and Boost libraries on Intel Core i5 machines with Ubuntu 20.04. A parallel Web Real-Time Communication (WebRTC) system is developed for comparative study using Java scripts (JS). The WebRTC system is built to stream stored WebM (VP8/VP9 encoded video). Standard video sequences are considered for the experiment. The sequences are chosen as per Table 1. In both the present disclosure and the WebRTC implementations the received videos are stored for full referential measurements. For the present disclosure raw frames are fed to a dummy acquisition unit. For WebRTC, the sequences are encoded using a Web media (WebM) encoder and fed to the streamer. The visual objective metrics are measured for peak signal-to-noise ratio (PSNR), Structural Similarity Index Measure (SSIM), video quality metric (VQM) and Video Multimethod Assessment Fusion (VMAF) parameters.

Figure 13:
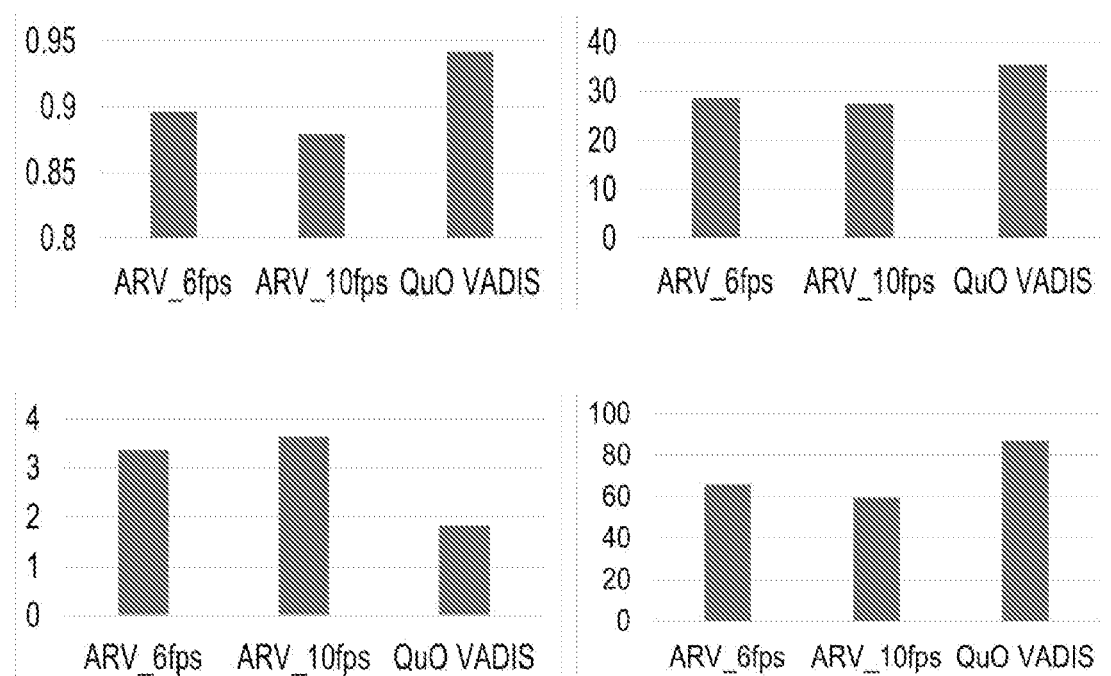
FIG. 13 is a graph showing the full referential visual comparison between the ARV at 6 and 10 fps and the present disclosure at 10 fps under simulated environment with bandwidth limit 512 kbits/s, in accordance with some embodiments of the present disclosure.

The performance of the present disclosure is first compared with the ARV of the applicant. Then the present disclosure is compared with WebRTC under practical impairments. The transmitter Tx and the receiver Rx are connected over Wireless-Fidelity (WiFi) using a Realme Nazro 30 phone as the access point (AP). The AP is found to be quite conservative for intranet routing. The observed average end-to-end RTT=150 ms and BW=11 Mbits/s. The AP is first kept in the vicinity of both the transmitter Tx and the receiver Rx and channel bandwidth is limited to 512 kbits/at both respective (Tx and Rx) interfaces, and the performance of the present disclosure is tested with ARV at 10 fps for Akiyo sequence. FIG. 13 is a graph showing the full referential visual comparison between the ARV at 6 and 10 fps and the present disclosure at 10 fps under simulated environment with bandwidth limit 512 kbits/s, in accordance with some embodiments of the present disclosure. As shown in FIG. 13, the present disclosure outperforms ARV as testified by the results. The degraded performance of ARV under constrained channel bandwidth, even under no loss, is attributed to the lack of a QoE aware Bitrate adaptation mechanism. Due to this it fails to adaptively compress the video according to the channel capacity, leading to heavy frame loss. But the present disclosure could successfully adapt its bitrate without trading off the foveal region quality leading to a high end-user QoE. The ARV could not work above 6 fps.

Figure 14:
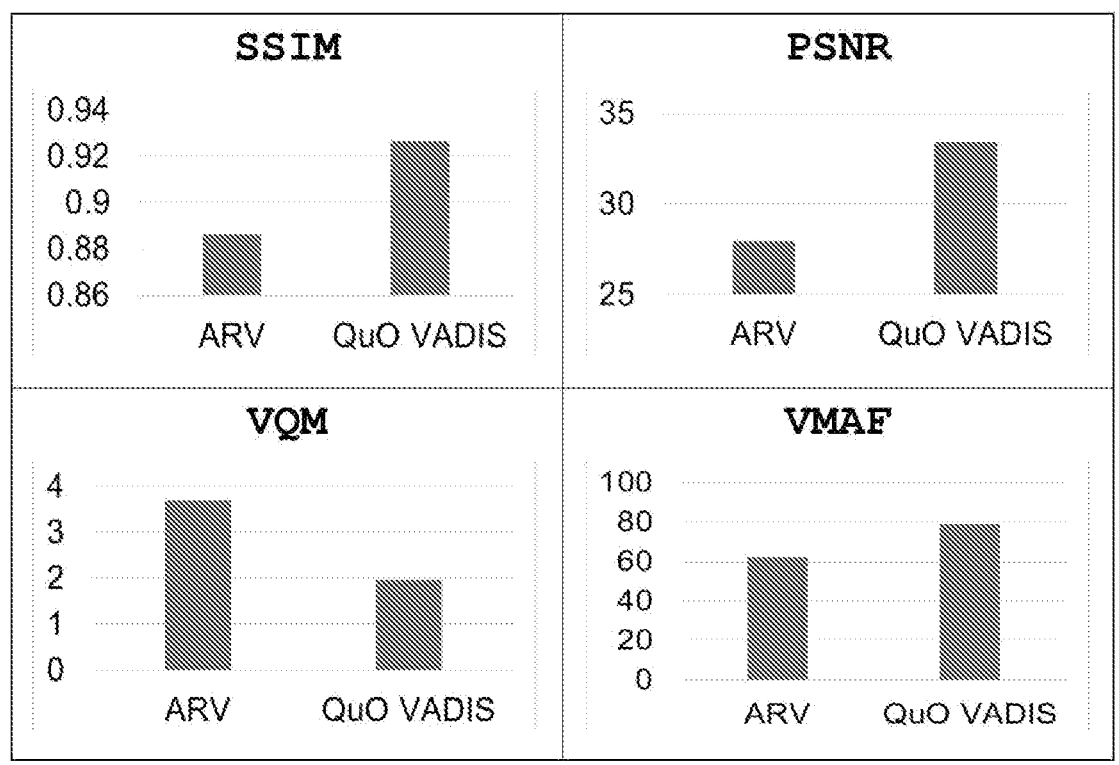
FIG. 14 is a graph showing the full referential visual metric comparison between the ARV and the present disclosure along with RSSI trajectory, in accordance with some embodiments of the present disclosure.

For the second type of experiment, the AP is moved in a fixed U-shaped trajectory for 120 s resulting in a continuous RSSI dip-and-lift at the Tx and Rx nodes. Even here the ARV shows inferior performance due to its inability to adapt to channel conditions through bitrate adaptation by spatial compression. Although it has intrinsic framerate adaptation, but it is of little advantage under an impaired last mile scenario with low RSSI. But full frame transmission, even at a lower fps, is taxing on the network adding to congestion. In turn end-user experience suffers. FIG. 14 is a graph showing the full referential visual metric comparison between the ARV and the present disclosure along with RSSI trajectory, in accordance with some embodiments of the present disclosure. As shown in FIG. 14, present disclosure shows consistent good performance by quickly recovering from loss.

The embodiments of present disclosure herein address unresolved problem of providing the quality of experience (QoE)-centric adaptive bitrate encoding for the live video stream, through a practically realizable QoE-centric bitrate adaptation mechanism which tightly couples spatiotemporal signal-processing at the application with instantaneous channel state and reacts based on a weighted tuning of multiple aspects affecting the end-user experience.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for quality of experience (QoE)-centric adaptive bitrate encoding for a live video stream, comprising the steps of:
    acquiring for a current video frame of the live video stream transmitted by a transmitter using an acquisition device, via one or more hardware processors, an area of a foveal region and an area of a peripheral region, using a foveal radius of the corresponding current video frame of the live video stream;
    initializing for each of one or more successive video frames of the live video stream, via the one or more hardware processors, a quality of the foveal region, a quality of the peripheral region, a foveal breathing parameter, and a maximum desired frame rate;
    encoding spatially at the transmitter, via the one or more hardware processors, each of the one or more successive video frames of the live video stream, based on the quality of the foveal region, the quality of the peripheral region, the foveal breathing parameter, and the maximum desired frame rate;
    receiving at the transmitter, via the one or more hardware processors, an instantaneous feedback of a video quality, based on the one or more successive video frames of the live video stream, from a receiver, on a periodic timer expiry;
    selecting, via the one or more hardware processors, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter;
    adaptively switching, via the one or more hardware processors, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase;
    packetizing, via the one or more hardware processors, the one or more encoded successive video frames of the live video stream, into one or more packets, using a packetization technique; and
    transmitting, via the one or more hardware processors, the one or more packets, to the receiver, through an adaptive real-time streaming technique.

2. The method of claim 1, further comprising:
    receiving, via the one or more hardware processors, the one or more packets, at the receiver; and
    reconstructing, via the one or more hardware processors, the one or more frames from the one or more packets, depending on the encoding scheme employed at the transmitter.

3. The method of claim 1, further comprising:
    reducing, via the one or more hardware processors, the maximum desired frame rate, if an actual bandwidth of the network is not satisfied for transmitting the one or more encoded successive video frames of the live video stream to the receiver;
    further encoding, via the one or more hardware processors, the one or more encoded successive video frames of the live video stream, at the reduced maximum desired frame rate, for transmission; and
    adaptively managing, via the one or more hardware processors, the quality of the foveal region to satisfy an actual bitrate supported by the network.

4. The method of claim 3, further comprising:
    increasing, via the one or more hardware processors, the maximum desired frame rate, if the current bandwidth of the network required for transmitting the one or more encoded successive video frames of the live video stream, is less than the actual bandwidth of the network, at the current frame rate;
    further encoding, via the one or more hardware processors, the one or more encoded successive video frames of the live video stream, at the increased maximum desired frame rate, for transmission; and
    adaptively managing, via the one or more hardware processors, the quality of the foveal region to satisfy the actual bitrate supported by the network.

5. The method of claim 1, wherein:
    the instantaneous feedback of the video quality of the live video stream, is an error rate determined based on the video quality of the live video stream,
    the foveal radius of the video frame of the live video stream, is calculated using an image height, an image width, and a foveal radius percentage factor of the corresponding video frame, and
    the foveal breathing parameter for each video frame is calculated using the area of the foveal region and the area of the peripheral region.

6. The method of claim 1, wherein adaptively switching the selected encoding scheme between one of two encoder phases (i) the foveal phase, (ii) the peripheral phase, for employing the one or more successive video frames of the live video stream to obtain the one or more encoded successive video frames of the live video stream, is depending on an error rate of the live video stream.

7. The method of claim 1, wherein adaptively switching the selected encoding scheme between one of two encoder phases (i) the foveal phase, (ii) the peripheral phase, based on the feedback received at the transmitter by the receiver, for employing the one or more successive video frames of the live video stream to obtain the one or more encoded successive video frames of the live video stream, is by tuning sequentially (i) the quality of the foveal region, (ii) the foveal breathing parameter, (iii) the maximum desired frame rate, and (iv) the quality of the peripheral region, wherein:
  (a) firstly, tuning the quality of the peripheral region until the actual bandwidth of the network is satisfied;
  (b) secondly tuning the foveal breathing parameter until the actual bandwidth of the network is satisfied, while tuning the quality of the peripheral region does not satisfy the actual bandwidth of the network;
  (c) thirdly, tuning the maximum desired frame rate until the actual bandwidth of the network is satisfied, while tuning the quality of the peripheral region and the foveal breathing parameter does not satisfy the actual bandwidth of the network; and
  (d) lastly, tuning the quality of the foveal region until the actual bandwidth of the network is satisfied, while tuning the quality of the peripheral region, the foveal breathing parameter, and the maximum desired frame rate does not satisfy the actual bandwidth of the network.

8. The method of claim 1, wherein employing the one or more successive video frames of the live video stream through median based matrix sparsification for bitrate adaptation in the peripheral phase, comprises:
  (a) determining a change in predominant error rate for each of the one or more successive video frames, wherein the predominant error rate is obtained from the feedback of the instantaneous video quality of the live video stream;
  (b) obtaining an initial quantized matrix associated with a fundamental coding block for each of the one or more successive video frames of the live video stream;
  (c) determining a scaling factor, based on (i) the change in predominant error rate for each of the one or more successive video frames using the corresponding initial quantized matrix, and (ii) a predominant error rate threshold, through a median position updation (MPU) algorithm;
  (d) dividing and multiplying the initial quantized matrix with the scaling factor, to obtain a scaled quantized matrix associated with the fundamental coding block for each of the one or more successive video frames;
  (e) determining the quality of the peripheral region associated with each of the one or more successive video frames, using the corresponding scaled quantized matrix; and
  (f) repeating the steps (a) through (e), based on the feedback of the instantaneous video quality of the live video stream and the quality of the peripheral region associated with each of the one or more successive video frames, to obtain the one or more encoded successive video frames of the live video stream.

9. The method of claim 1, wherein employing the one or more successive video frames of the live video stream through foveal breathing for bitrate adaptation in the foveal phase, comprises:
  obtaining a predominant error rate from the feedback of the instantaneous video quality of the live video stream, to determine a change in the predominant error rate for each of the one or more successive video frames;
  performing one of: (i) a foveal shrinking on each of the one or more successive video frames when the change in the predominant error rate is greater than or equal to a predominant error rate threshold, and (ii) a foveal expansion on the each of the one or more successive video frames when the change in the predominant error rate is less than to the predominant error rate threshold, to obtain the one or more encoded successive video frames of the live video stream,
  wherein performing the foveal shrinking on each of the one or more successive video frames when the change in the predominant error rate is greater than or equal to the predominant error rate threshold, comprises:
    obtaining a current foveal radius percentage factor for each of the one or more successive video frames of the live video stream;
    determining a successive foveal radius percentage factor for each of the one or more successive video frames, by dividing the corresponding current foveal radius percentage factor with a foveal shrinking factor, if the current foveal radius percentage factor is greater than a minimum foveal radius percentage factor threshold;
    determining the foveal breathing parameter for each of the one or more successive video frames; and
    obtaining the one or more encoded successive video frames of the live video stream, by shrinking each of the one or more successive video frames based on the corresponding foveal breathing parameter and using the corresponding successive foveal radius percentage factor, and
  wherein performing the foveal expansion on each of the one or more successive video frames when the change in the predominant error rate is less than the predominant error rate threshold, comprises:
    obtaining a current foveal radius percentage factor for each of the one or more successive video frames of the live video stream;
    determining a successive foveal radius percentage factor for each of the one or more successive video frames, by adding the corresponding current foveal radius percentage factor with a foveal expansion factor, if the current foveal radius percentage factor is less than to a maximum foveal radius percentage factor threshold;
    determining the foveal breathing parameter for each of the one or more successive video frames; and
    obtaining the one or more encoded successive video frames of the live video stream, by expanding each of the one or more successive video frames based on the corresponding foveal breathing parameter and using the corresponding successive foveal radius percentage factor.

10. A system for quality of experience (QoE)-centric adaptive bitrate encoding for streaming of a live video stream, comprising:
  a memory storing instructions;
  one or more input/output (I/O) interfaces;

an acquisition device; and
one or more hardware processors coupled to the memory via the one or more I/O interfaces, wherein the one or more hardware processors are configured by the instructions to:
acquire for a current video frame of the live video stream transmitted by a transmitter using an acquisition device, an area of a foveal region and an area of a peripheral region, using a foveal radius of the corresponding current video frame of the live video stream;
initialize for each of one or more successive video frames of the live video stream, a quality of the foveal region, a quality of the peripheral region, a foveal breathing parameter, and a maximum desired frame rate;
encode spatially at the transmitter, each of the one or more successive video frames of the live video stream, based on the quality of the foveal region, the quality of the peripheral region, the foveal breathing parameter, and the maximum desired frame rate;
receive at the transmitter, an instantaneous feedback of a video quality, based on the one or more successive video frames of the live video stream, from a receiver, on a periodic timer expiry;
select, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter;
adaptively switch, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase;
packetize, the one or more encoded successive video frames of the live video stream, into one or more packets, using a packetization technique; and
transmit, the one or more packets, to the receiver, through an adaptive real-time streaming technique.

11. The system of claim 10, wherein the one or more hardware processors are further configured to:
receive one or more packets, at the receiver; and
reconstruct the one or more frames from the one or more packets, depending on the encoding scheme employed at the transmitter.

12. The system of claim 10, wherein the one or more hardware processors are further configured to:
reduce the maximum desired frame rate, if an actual bandwidth of the network is not satisfied for transmitting the one or more encoded successive video frames of the live video stream to the receiver;
further encode the one or more encoded successive video frames of the live video stream, at the reduced maximum desired frame rate, for transmission; and
adaptively manage the quality of the foveal region to satisfy an actual bitrate supported by the network.

13. The system of claim 12, wherein the one or more hardware processors are further configured to:
increase the maximum desired frame rate, if the current bandwidth of the network required for transmitting the one or more encoded successive video frames of the live video stream, is less than the actual bandwidth of the network, at the current frame rate;
further encode the one or more encoded successive video frames of the live video stream, at the increased maximum desired frame rate, for transmission; and
adaptively manage the quality of the foveal region to satisfy the actual bitrate supported by the network.

14. The system of claim 10, wherein:
the instantaneous feedback of the video quality of the live video stream, is an error rate determined based on the video quality of the live video stream,
the foveal radius of the video frame of the live video stream, is calculated using an image height, an image width, and a foveal radius percentage factor of the corresponding video frame, and
the foveal breathing parameter for each video frame is calculated using the area of the foveal region and the area of the peripheral region.

15. The system of claim 10, wherein the one or more hardware processors are configured to adaptively switch the selected encoding scheme between one of two encoder phases (i) the foveal phase, (ii) the peripheral phase, for employing the one or more successive video frames of the live video stream to obtain the one or more encoded successive video frames of the live video stream, depending on an error rate of the live video stream.

16. The system of claim 10, wherein the one or more hardware processors are configured to adaptively switch the selected encoding scheme between one of two encoder phases (i) the foveal phase, (ii) the peripheral phase, based on the feedback received at the transmitter by the receiver, for employing the one or more successive video frames of the live video stream to obtain the one or more encoded successive video frames of the live video stream, by tuning sequentially (i) the quality of the foveal region, (ii) the foveal breathing parameter, (iii) the maximum desired frame rate, and (iv) the quality of the peripheral region, wherein
(a) firstly, tuning the quality of the peripheral region until the actual bandwidth of the network is satisfied;
(b) secondly tuning the foveal breathing parameter until the actual bandwidth of the network is satisfied, while tuning the quality of the peripheral region does not satisfy the actual bandwidth of the network;
(c) thirdly, tuning the maximum desired frame rate until the actual bandwidth of the network is satisfied, while tuning the quality of the peripheral region and the foveal breathing parameter does not satisfy the actual bandwidth of the network; and
(d) lastly, tuning the quality of the foveal region until the actual bandwidth of the network is satisfied, while tuning the quality of the peripheral region, the foveal breathing parameter, and the maximum desired frame rate does not satisfy the actual bandwidth of the network.

17. The system of claim 10, wherein the one or more hardware processors are configured to employ the one or more successive video frames of the live video stream through median based matrix sparsification for bitrate adaptation in the peripheral phase, by:
(a) determining a change in predominant error rate for each of the one or more successive video frames, wherein the predominant error rate is obtained from the feedback of the instantaneous video quality of the live video stream;

(b) obtaining an initial quantized matrix associated with a fundamental coding block for each of the one or more successive video frames of the live video stream;

(c) determining a scaling factor, based on (i) the change in predominant error rate for each of the one or more successive video frames using the corresponding initial quantized matrix, and (ii) a predominant error rate threshold, through a median position updation (MPU) algorithm;

(d) dividing and multiplying the initial quantized matrix with the scaling factor, to obtain a scaled quantized matrix associated with the fundamental coding block for each of the one or more successive video frames;

(e) determining the quality of the peripheral region associated with each of the one or more successive video frames, using the corresponding scaled quantized matrix; and (f) repeating the steps (a) through (e), based on the feedback of the instantaneous video quality of the live video stream and the quality of the peripheral region associated with each of the one or more successive video frames, to obtain the one or more encoded successive video frames of the live video stream.

18. The system of claim 10, wherein the one or more hardware processors are configured to employ the one or more successive video frames of the live video stream through foveal breathing for bitrate adaptation in the foveal phase, by:

obtaining a predominant error rate from the feedback of the instantaneous video quality of the live video stream, to determine a change in the predominant error rate for each of the one or more successive video frames; and performing one of: (i) a foveal shrinking on each of the one or more successive video frames when the change in the predominant error rate is greater than or equal to a predominant error rate threshold, and (ii) a foveal expansion on the each of the one or more successive video frames when the change in the predominant error rate is less than to the predominant error rate threshold, to obtain the one or more encoded successive video frames of the live video stream, wherein the one or more hardware processors are configured to perform the foveal shrinking on each of the one or more successive video frames when the change in the predominant error rate is greater than or equal to the predominant error rate threshold, by:

obtaining a current foveal radius percentage factor for each of the one or more successive video frames of the live video stream;

determining a successive foveal radius percentage factor for each of the one or more successive video frames, by dividing the corresponding current foveal radius percentage factor with a foveal shrinking factor, if the current foveal radius percentage factor is greater than a minimum foveal radius percentage factor threshold;

determining the foveal breathing parameter for each of the one or more successive video frames; and obtaining the one or more encoded successive video frames of the live video stream, by shrinking each of the one or more successive video frames based on the corresponding foveal breathing parameter and using the corresponding successive foveal radius percentage factor, and wherein the one or more hardware processors are configured to perform the foveal expansion on each of the one or more successive video frames when the change in the predominant error rate is less than the predominant error rate threshold, by:

obtaining a current foveal radius percentage factor for each of the one or more successive video frames of the live video stream;

determining a successive foveal radius percentage factor for each of the one or more successive video frames, by adding the corresponding current foveal radius percentage factor with a foveal expansion factor, if the current foveal radius percentage factor is less than to a maximum foveal radius percentage factor threshold;

determining the foveal breathing parameter for each of the one or more successive video frames; and obtaining the one or more encoded successive video frames of the live video stream, by expanding each of the one or more successive video frames based on the corresponding foveal breathing parameter and using the corresponding successive foveal radius percentage factor.

19. One or more non-transitory machine-readable information storage mediums comprising one or more instructions which when executed by one or more hardware processors cause:

acquiring for a current video frame of the live video stream transmitted by a transmitter using an acquisition device, an area of a foveal region and an area of a peripheral region, using a foveal radius of the corresponding current video frame of the live video stream;

initializing for each of one or more successive video frames of the live video stream, a quality of the foveal region, a quality of the peripheral region, a foveal breathing parameter, and a maximum desired frame rate;

encoding spatially at the transmitter, each of the one or more successive video frames of the live video stream, based on the quality of the foveal region, the quality of the peripheral region, the foveal breathing parameter, and the maximum desired frame rate;

receiving at the transmitter, an instantaneous feedback of a video quality, based on the one or more successive video frames of the live video stream, from a receiver, on a periodic timer expiry;

selecting, one of encoding schemes comprising: (i) a scheme for a basic full frame encoding or for I-frames encoding, and (ii) a scheme for a background subtracted delta frame encoding or for P-frames encoding or for B-frames encoding, for encoding the one or more successive video frames of the live video stream, at the transmitter;

adaptively switching, the selected encoding scheme between one of two encoder phases (i) a foveal phase, (ii) a peripheral phase, based on the instantaneous feedback of the video quality, for employing the one or more successive video frames of the live video stream to obtain one or more encoded successive video frames of the live video stream, wherein, the one or more successive video frames of the live video stream are employed through foveal breathing for bitrate adaptation in the foveal phase, and the one or more successive video frames of the live video stream are employed through median based matrix sparsification for bitrate adaptation in the peripheral phase;

packetizing, the one or more encoded successive video frames of the live video stream, into one or more packets, using a packetization technique;

transmitting, the one or more packets, to the receiver, through an adaptive real-time streaming technique;

receiving, the one or more packets, at the receiver; and reconstructing, the one or more frames from the one or more packets, depending on the encoding scheme employed at the transmitter.

20. The one or more non-transitory machine-readable information storage mediums of claim 19, wherein the one or more instructions which when executed by one or more hardware processors further cause:

reducing, the maximum desired frame rate, if an actual bandwidth of the network is not satisfied for transmitting the one or more encoded successive video frames of the live video stream to the receiver;

further encoding, the one or more encoded successive video frames of the live video stream, at the reduced maximum desired frame rate, for transmission;

adaptively managing, the quality of the foveal region to satisfy an actual bitrate supported by the network;

increasing, the maximum desired frame rate, if the current bandwidth of the network required for transmitting the one or more encoded successive video frames of the live video stream, is less than the actual bandwidth of the network, at the current frame rate;

further encoding, the one or more encoded successive video frames of the live video stream, at the increased maximum desired frame rate, for transmission; and adaptively managing, the quality of the foveal region to satisfy the actual bitrate supported by the network.

* * * * *